(12) United States Patent
Ledereich

(10) Patent No.: US 8,827,857 B2
(45) Date of Patent: Sep. 9, 2014

(54) PLANETARY TRANSMISSION HAVING A SEGMENTED RING

(76) Inventor: Giora Ledereich, Kiryat Tivon (IL)

( * ) Notice: Subject to any disclaimer, the term of this patent is extended or adjusted under 35 U.S.C. 154(b) by 0 days.

(21) Appl. No.: 13/809,424

(22) PCT Filed: Jul. 13, 2011

(86) PCT No.: PCT/IB2011/053134
§ 371 (c)(1),
(2), (4) Date: Jan. 10, 2013

(87) PCT Pub. No.: WO2012/007915
PCT Pub. Date: Jan. 19, 2012

(65) Prior Publication Data
US 2013/0116081 A1 May 9, 2013

Related U.S. Application Data

(60) Provisional application No. 61/363,672, filed on Jul. 13, 2010.

(51) Int. Cl.
*F16H 37/08* (2006.01)
*F16H 3/44* (2006.01)
*F16H 1/00* (2006.01)

(52) U.S. Cl.
CPC ... *F16H 3/44* (2013.01); *F16H 1/00* (2013.01)
USPC ............................................. 475/205; 475/331

(58) Field of Classification Search
USPC ......... 475/198, 205, 207, 210, 219, 221, 225, 475/296, 331
See application file for complete search history.

(56) References Cited

U.S. PATENT DOCUMENTS

| | | | |
|---|---|---|---|
| 4,257,284 A | | 3/1981 | Ashauer |
| 5,360,380 A | * | 11/1994 | Nottle ............................ 475/182 |
| 6,428,443 B1 | | 8/2002 | Dischler |
| 7,887,451 B2 | * | 2/2011 | Baumann ....................... 475/182 |
| 2010/0160106 A1 | | 6/2010 | Choi |

* cited by examiner

*Primary Examiner* — Justin Holmes

(57) ABSTRACT

A planetary gear-set for continuously varying the output ratio between torque and rotational velocity, in which a central static sun-gear is considered as a reference to all other components. The structural aspects include a set of segments of a ring gear each such segment includes a linked couple of cogwheels. Another set of couples of linked cogwheels, is a sun-gear follower and the coupled member is output transfer cogwheel. A mechanism for changing the orientation of the output transfer cogwheel with respect to the sun-gear follower. A transient link connects between the above two separate systems of sets.

5 Claims, 26 Drawing Sheets

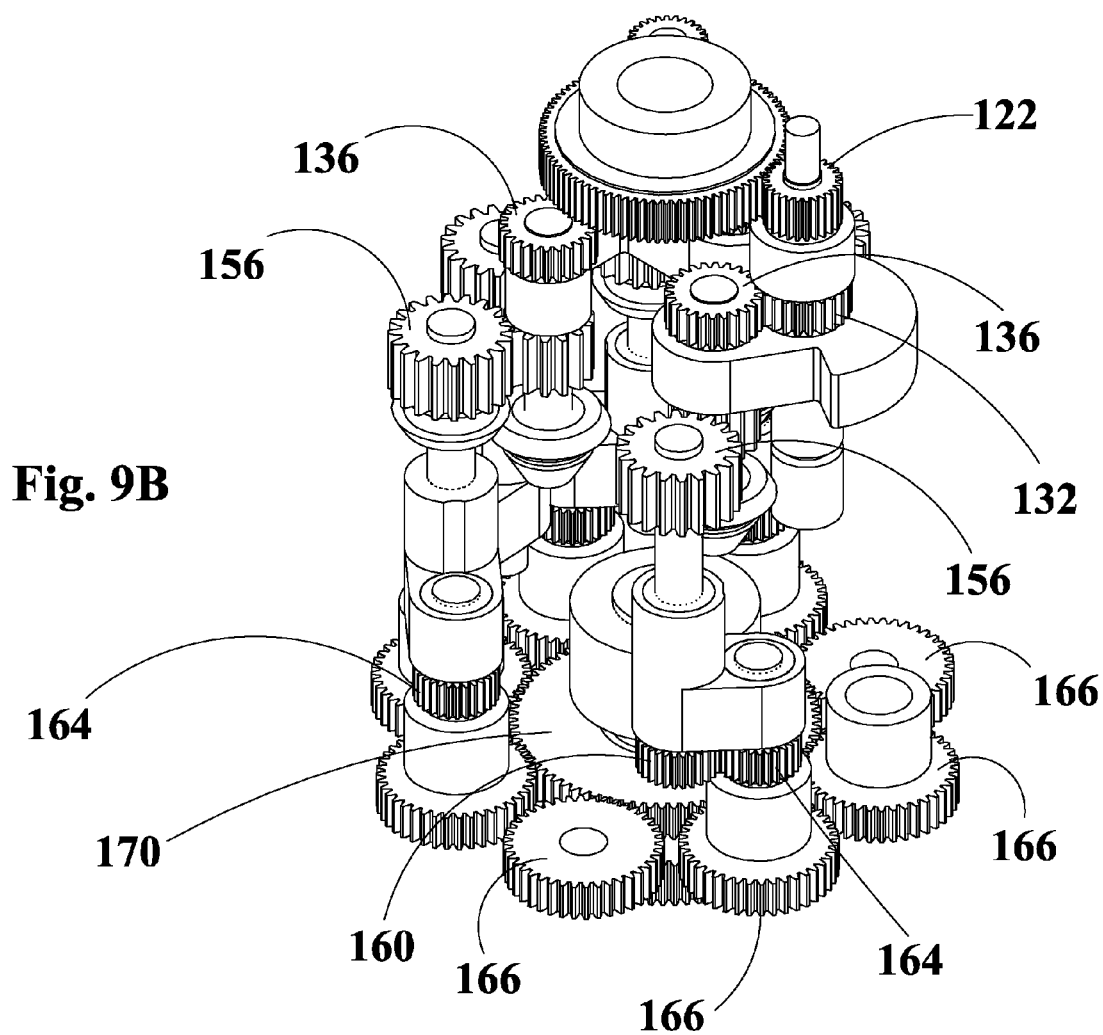

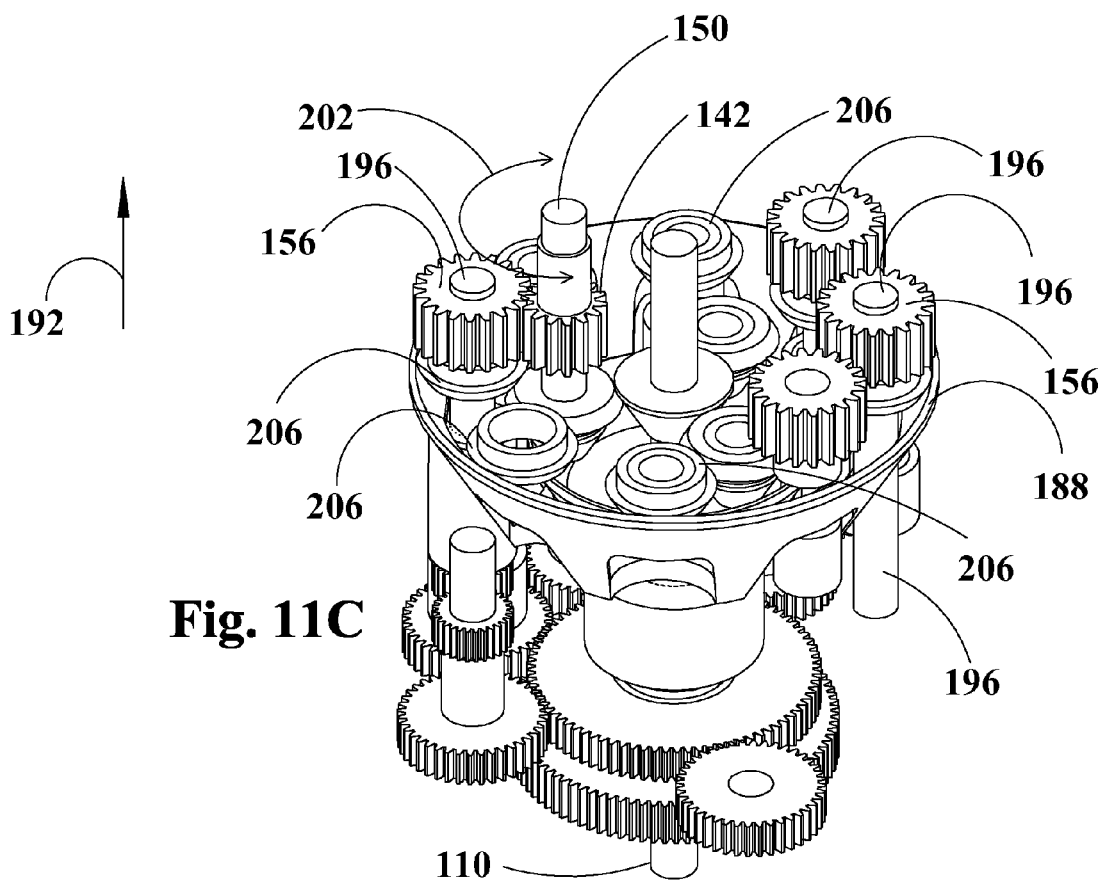

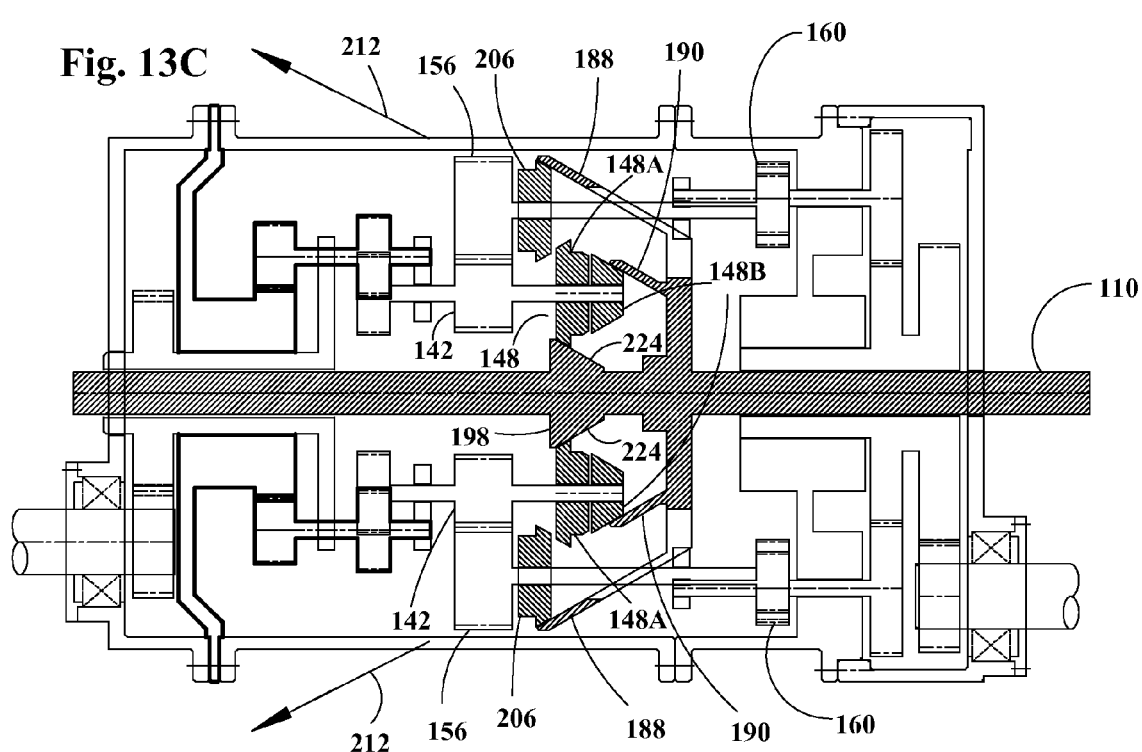

PLANETARY TRANSMISSION HAVING A SEGMENTED RING

CROSS-REFERENCE TO RELATED APPLICATIONS

This application is a U.S. National Phase Application under 35 U.S.C. 371 of PCT International Application No. PCT/IB2011/053134, which has an international filing date of Jul. 13, 2011, and which claims the benefit of priority from U.S. Provisional patent application No. 61/363,672, entitled "PLANETARY TRANSMISSION HAVING A FRAGMENTED RING", filed on Jul. 13, 2010, which is incorporated herein by reference in its entirety.

TECHNICAL FIELD OF THE INVENTION

The present invention relates to a mechanical system that facilitates efficient transmission of power from an engine to a load, such as from a car engine to its wheels.

BACKGROUND OF THE INVENTION

A transmission system is required for matching between the output rotation rate provided by a motor, usually measured in rpm, and the requirements of the driven load. Also, it can be defined that the transmission is require to match between the rotation rate at the output and torque at the output. Typically, transmission systems contain one or more sets of gears, which transform one rotation rate into a different rotation rate as specified by physical dimension relations between elements of the gear-set. Usually, this relates to the ratio between the radius of engaged gears which transfer torque and rotation from one gear to another. The gearing ratio is a single numerical value that describes the transformation ratio of a specific gear-set arrangement. Often however, a specific gear-set arrangement rather than sustaining one input rotation rate value, sustains a range of input rotation rates. The motor operates however more efficiently over a more restricted section of the sustainable range. When a desired input rotational velocity is required by a driven load, which lies outside of the permitted range of rotation rates allowed by a specific gear-set arrangement, a new gear-set arrangement is to be employed. A CVT (continuously variable transmission) differs from conventional transmission in that it can provide a continuous spectrum of gear ratios, rather than a discrete group of such ratios. A motor using CVT is able to almost always, between a range, operate in an optimal fuel/air ratio in Diesel engines, and in a gasoline engines, working with open throttle to achieve maximal compression and therefore better efficiency.

The present invention can be considered as a variant of the planetary gear set. Such gear sets as known in the art consist of the following components. The ring is the external gear that the planets come in contact with. The planet carrier: holds the planets as a unit. The planets: Transmit the rotation between the ring gear and the sun gear. The sun-gear: the central most gear, engageably surrounded by the spinning planets.

BRIEF DESCRIPTION OF THE DRAWINGS

FIG. 9B is an isometric view of a gearbox of a push pull gear ratio control embodiment showing sun follower and gears downstream up to the terminal collecting gear;

FIG. 11C is an isometric view of the gear ratio shifter module showing SATEs system;

FIG. 13C is a sectional view of a gear box of the internal-shifter-approach showing an extreme gear shift state in the expanded state;

DETAILED DESCRIPTION OF THE INVENTION

Figure 1B:
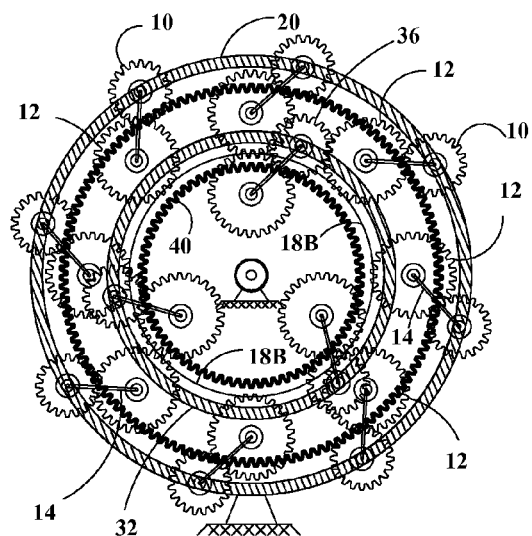
FIG. 1B is a schematic description of an exemplary layout of gears of a gear set in accordance with the invention, the gear set is in a contracted state.
Figure 1A:
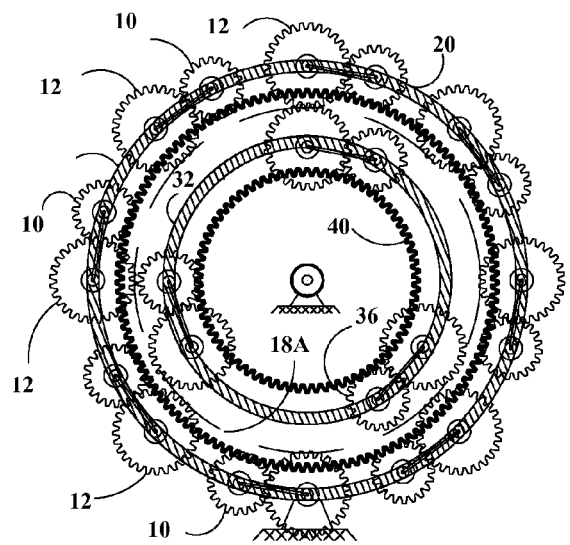
FIG. 1A is a schematic description of an exemplary layout of gears of a gear set in accordance with the invention, the gear set in an expanded state.
Figure 1C:
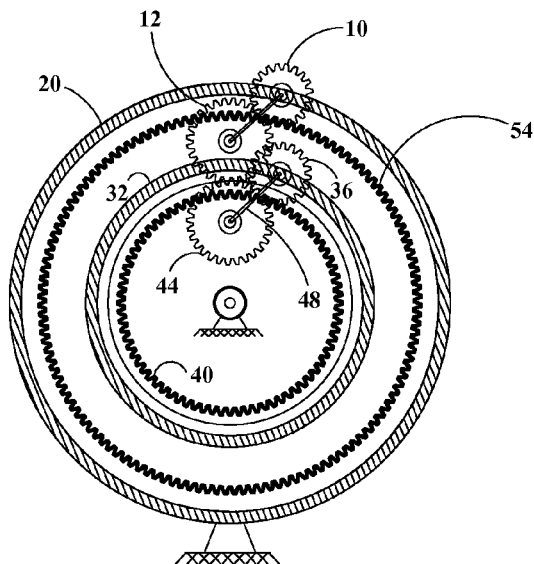
FIG. 1C is a schematic description of an exemplary layout of gears of a gear set in accordance with the invention, the gear set in simplified to show more details.
Figure 2:
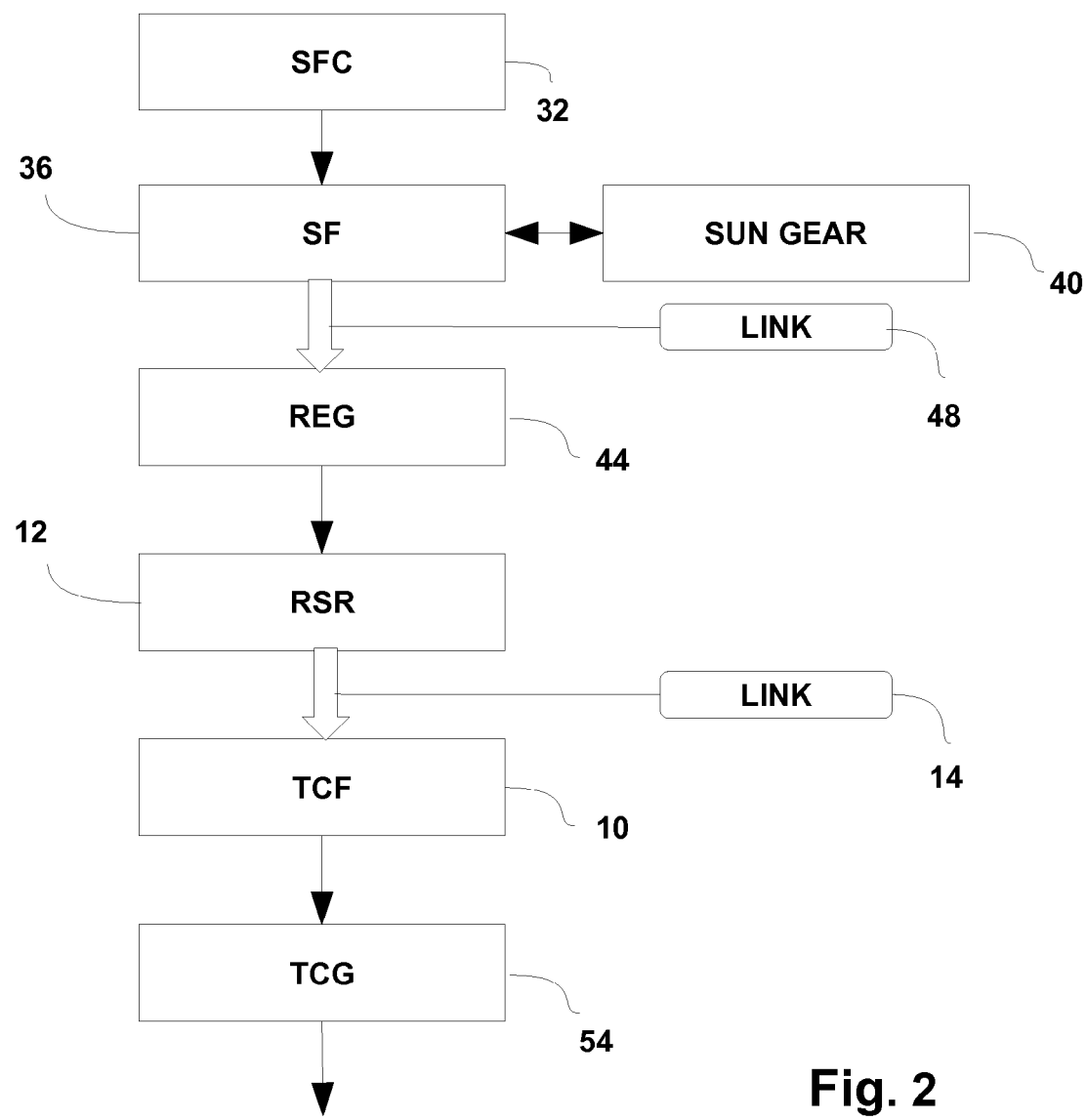
FIG. 2 is schematic chart showing the downstream flow of power in the gear-set.

The device of the invention can be envisioned as a modified planetary gear set. An embodiment of the invention is a gear-box implementing some structural features as will be explained hereinafter. Typically, a sun-gear is related to in the description as static while the planets and the ring rotate. This however is not mandatory and the sun may be rotating while some other gears may be static. The main structural elements of a gear set of the invention will be described first. In embodiments of the present invention, two sets of linked couples of cogwheels are spread out evenly in an imaginary circle. In FIGS. 1A and 1B, each linked couple includes cogwheel 10 and cogwheel 12 coupled swivably but permanently together by a link 14 having a certain length indicated as link only in FIG. 1B but existing in any the formation represented in FIG. 1A as well. The length of link 14 keeps the two members of the couple constantly meshed together. In FIG. 1A an inner imaginary circle 18A, indicates the innermost reach of cogwheels 12. In FIG. 1B that inner reach circle is designated 18B. Circle 18A is larger than circle 18B having a larger diameter than circle 18B are tangent to the innermost reach of cogwheels 12 in each case respectively. The number of the linked couples in the set just described is eight in this case, but the number may vary. Annulus 20 drawn hatched is a physical ring. In which axles of cogwheels 10 are held. Cogwheels 12, each linked to its respective coupled cogwheel 10 have an axle each which is not confined to a ring but rather to link 14. As a consequence of these features, cogwheels 10 are confined to a certain place on annulus 20, while cogwheels 12 have some freedom of movement each around the respective cogwheel 10, each one around the respective linked cogwheel. Another set of coupled cogwheel couples resides in an inner circle. Physical ring 32 bears evenly spread axles of cogwheels 36. In FIG. 1C some components are removed to help explain the structure of the gear set and some functional aspects thereof. Sun-gear 40 is a solid cylindrical body with toothed circumference, sun follower (SF) 36 is a cogwheel that is always meshed with the sun-gear. The SF is coupled to a cogwheel, the ring engaging gear (REG). REG 44 is permanently kept in meshing relationships with the SF 36, by link 48. REG 44 is therefore meshed with SF 36, but also with cogwheel 12. The meshing of REG 44 with cogwheel 12 is however transient as will be explained later on. The linked couple of cogwheels 12 and 10, permanently meshed by link 14, represent in effect the ring gear of a planetary gear set, and because there is a set of such several equal linked couples, the ring equivalent is considered as segmented. Each such couple of linked cogwheels is referred to sometimes as a ring segment (RS). The planetary gear set described has three dimensional structural aspects that will be described later on. Cogwheel 54 is solid cylindrical body, typically in a different level than sun-gear 40. It is referred to as the terminal collecting gear (TCG). The set of identical cogwheels 10 will therefore be referred to as the set of terminal collector followers (TCF) and the set of cogwheels 12 is the set of identical ring segment receivers (RSR) as they receive power from REG 44. To summarise the relationships between the cogwheels, reference is made to FIG. 2. SF carrier (SFC) 32 rotates and transfers power to SF 36 as will be explained functionally below. SF 36 is connected permanently via a link to REG 44, and RSR 12 is connected permanently via link to TCF 10. TCG 54 collects the power from all the TCF units 10.

To explain prominent spatial aspects of the planetary gear set of the invention, reference is made now to FIGS. 3A-C and 4. Sun gear 40, although in a typical embodiment is static, in this case it is demonstrated showing axle 62. Sun follower SF 36 rotatable around its axle 64 and around the periphery of sun gear 40, with which it is engaged (meshed). SF 36 is also engaged with ring engaging gear (REG) 44, located on a different plane then sun-gear 40, so that REG 44 can revolve around SF 36, without ever contracting sun gear 40. These structural aspects and others can be seen also in FIG. 3B which is a top side view of the unit. Sun-gear 40 is rotatable around axle 62, its teeth engaged with the teeth of SF 36, revolving around its own axle 64.

Figure 3A:
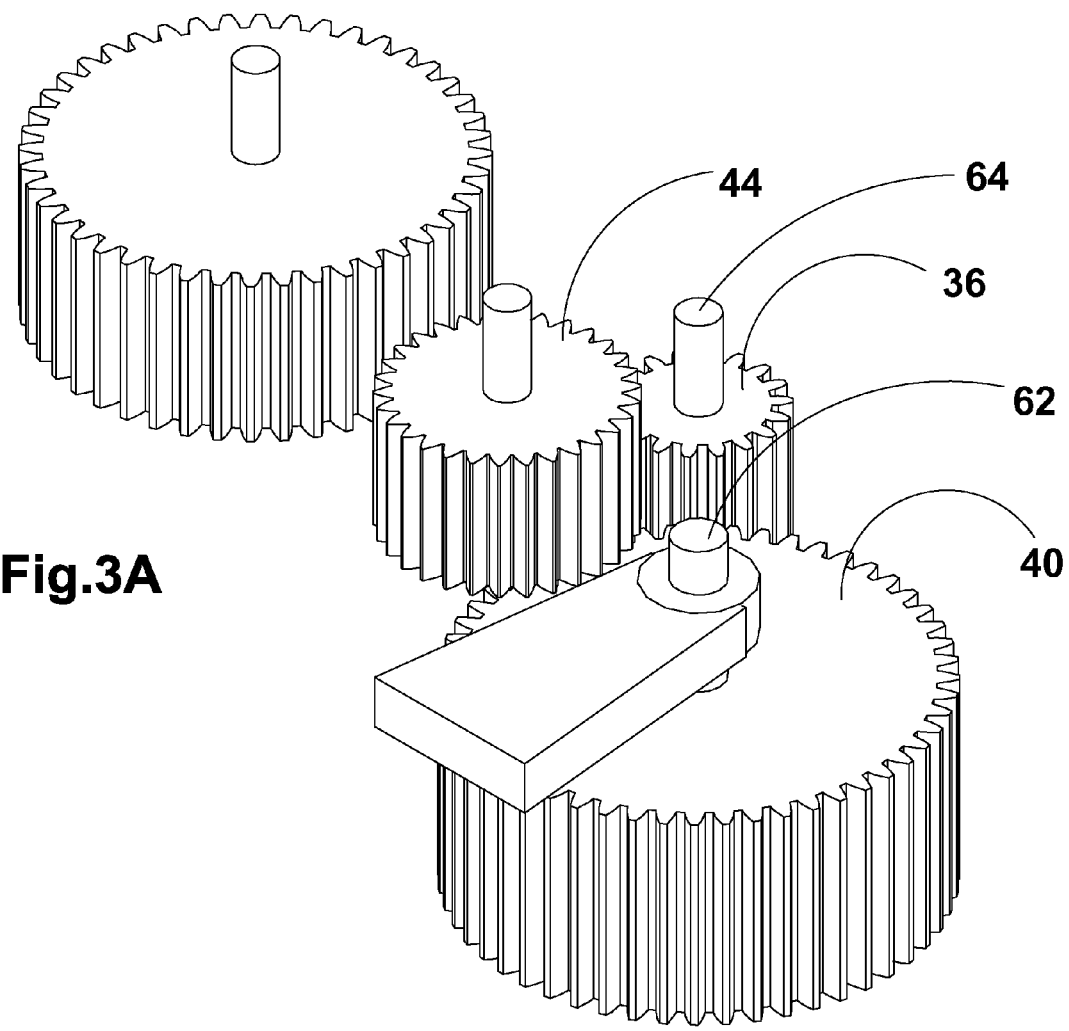
FIG. 3A is a schematic isomeric partial description of a functional unit of a functional gear fragment of the invention.
Figure 3B:
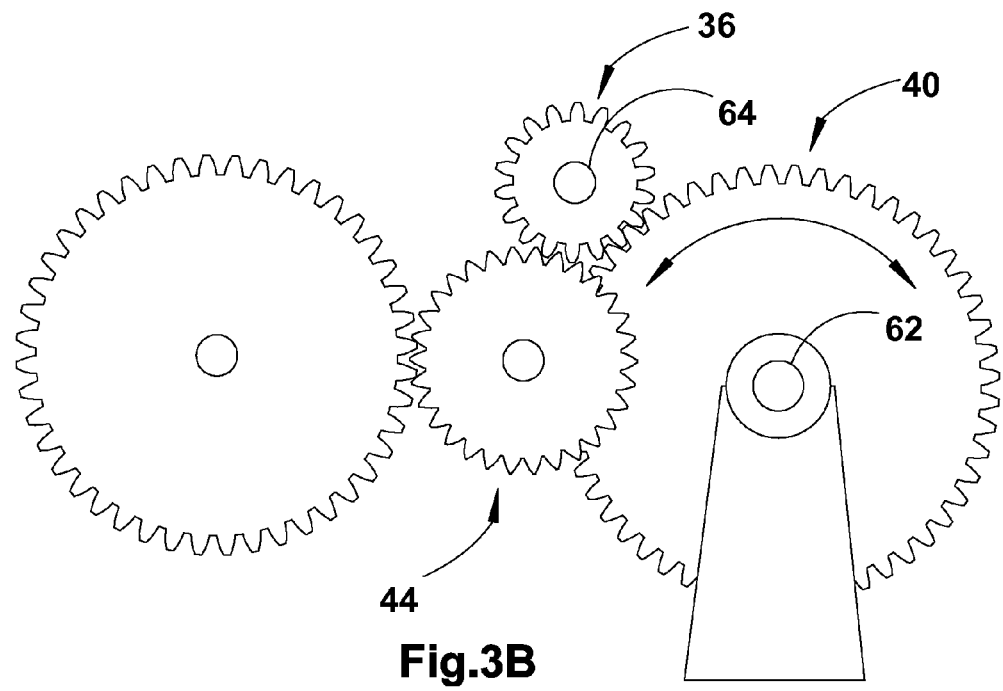
FIG. 3B is a schematic top side view description of a functional unit of the same functional gear fragment of the invention as in FIG. 3A.
Figure 3C:
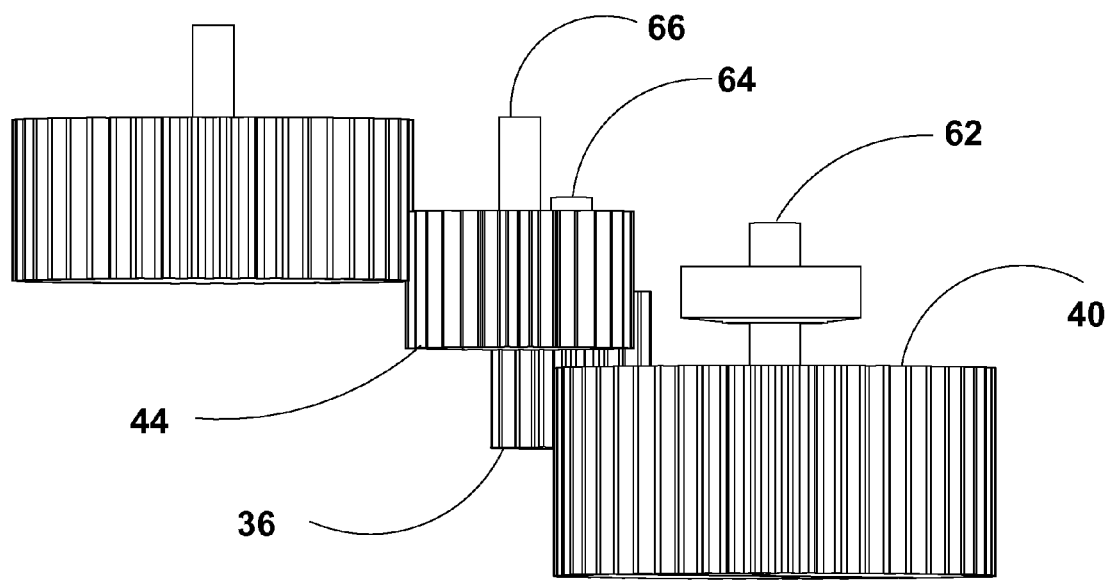
FIG. 3C is a schematic side view description of a functional unit of the same functional gear fragment of the invention as in FIG. 3A.
Figure 4A:
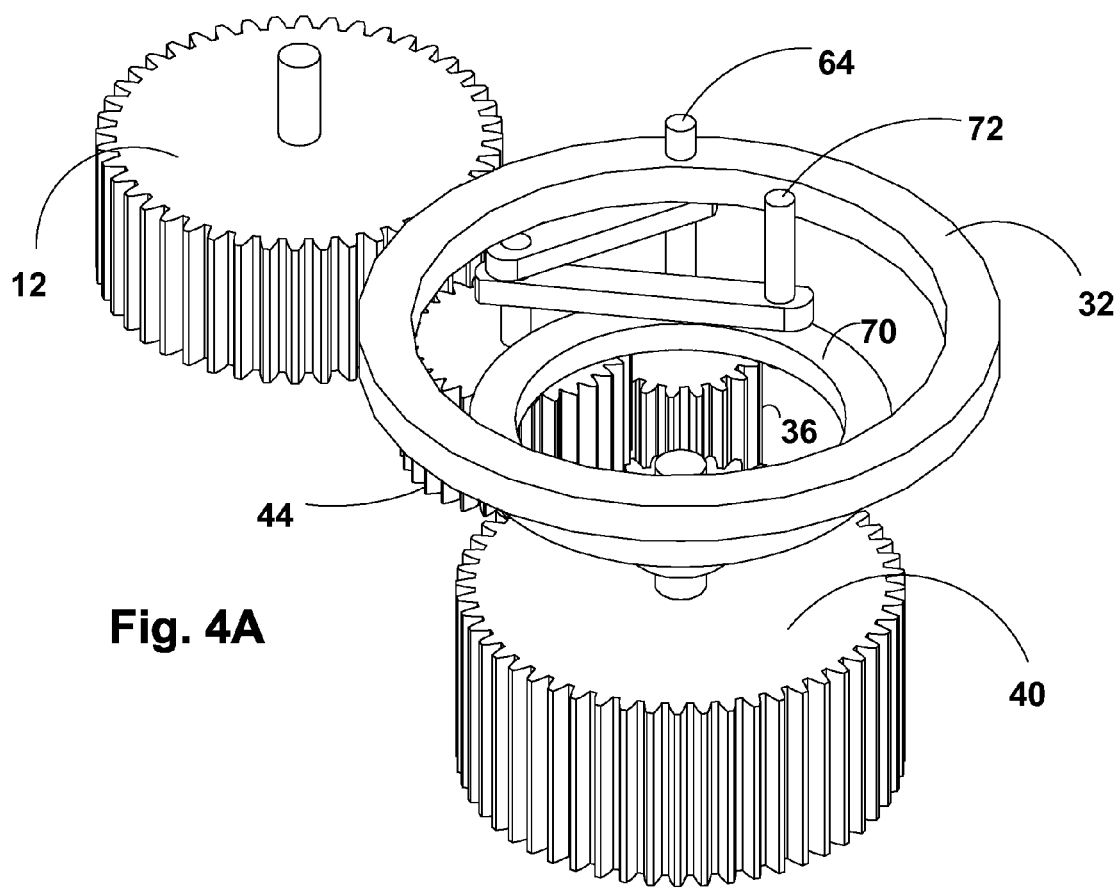
FIG. 4A is a schematic isomeric description of a functional unit of a functional gear fragment of the invention, including gear ratio control structure.
Figure 4B:
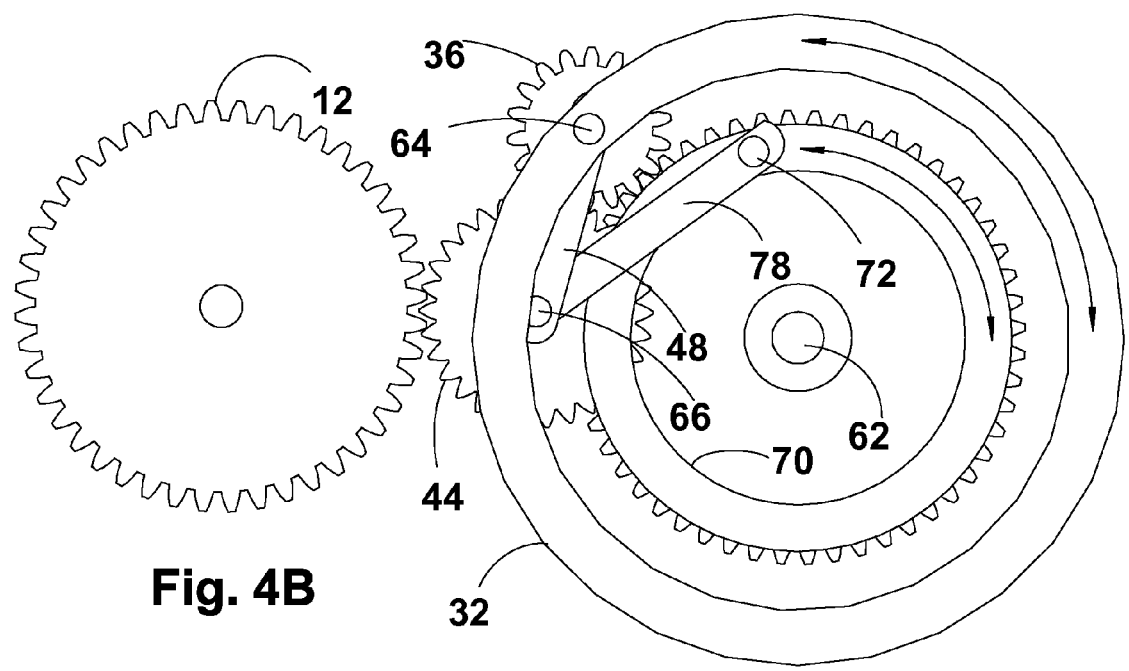
FIG. 4B is a schematic top side description of a functional unit of a I gear fragment of the invention, including gear ratio control structures.

REG 44 is also engageable with RSR 12, but it is always engaged with SF 36. REG 44 is therefore an output transfer cogwheel. In FIG. 3C, a side elevation is depicted, showing sun gear 40, it's pivot 62 and pivot 64, SF 36 and REG 44. In FIG. 4A, further structural aspects of the planetary gear set of the invention are shown. SF 36 revolves around axle 64. This pivot is revolvably connected with annulus 32 as described above, and in a typical situation this annulus has either 3 or 5 pivots connected to it revolvably, however, any number is applicable providing it complies with engineering considerations. Annulus 70 has pivots 72 connected to it. In a typical embodiment as mentioned above, there are either 3 or 5, pivots type 72 to annulus 70, but any number is applicable providing it complies with engineering consideration, structural constrains, etc. In FIG. 4B which is a top side view of the same segment of the gear set of the invention. Pivot 72 is not connected to a cogwheel directly, in other words it is not an axle. Annuli 32 and 70 both revolve as a rule in the same angular velocity, and their task is in some embodiments to receive power from a motor, usually indirectly, and transfer the power to the output wheel, at a different angular speed, regulated by changing the distance between the REGs and the centre of sun-gear 40, as designated by pivot 62. Pivot 66 of REG 44 is connected swivably to a connector arm, the function of which will be disclosed below. Although annuli 32 and 70 are not shown as if in the same plane, they may however be located in the same plane. In FIG. 4B which is a top side view of the same segment as the gear set as discussed heretofore, the connector arms are explained. Pivot 66 of REG 44 is connected by link 48 to pivot 64 of SF 36. The connection in each case is swivable so that the connector arms can swivel relative to the respective pivots. Connector arm 78 connects pivot 66 with pivot 72. It can be seen that in total, REG 44 has two connector arms connected to its axle, namely pivot 66. The connection in each case is swivable so that the link and connector arms can swivel relative to the respective pivots.

Figure 5:
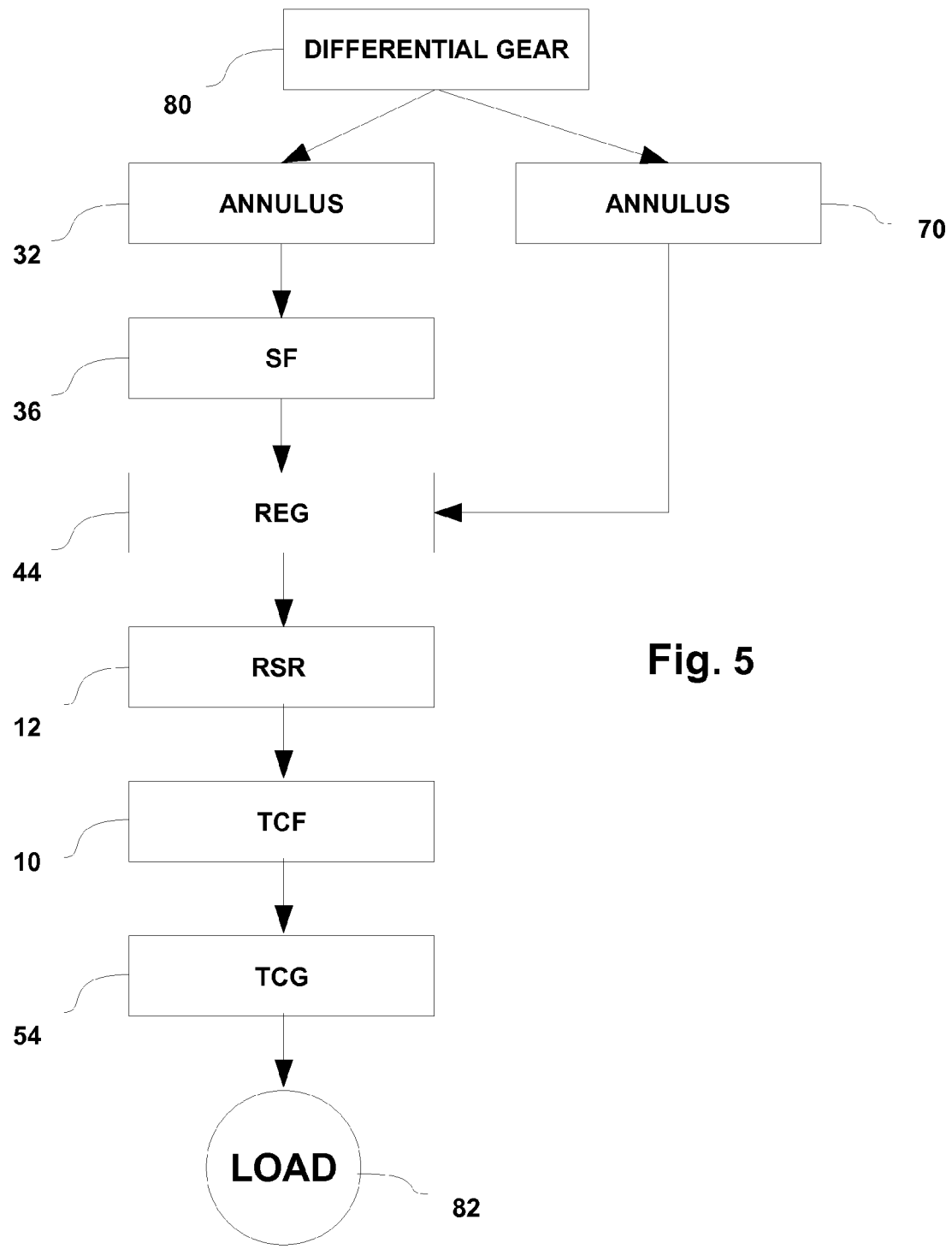
FIG. 5 is a flow chart describing schematically the flow of torque along the components of the system of the invention downstream from input to load.

Function:
  Controlling the torque/radial velocity ratio at the output of the device of the invention—using an external differential gear feed In an exemplary situation, the power (or torque) flow, heads in a downstream direction as described schematically in FIG. 5. The sun-gear is static, and the SFs, all of them (typically 3 or 5) are always engaged with it. The SFs can be therefore invisioned as circling the sun-gear, as long as energy is supplied to the gear-set. Energy, or in other aspect of the same effect, power or torque, is fed into the gear of the invention through annuli 32 and 70 simultaneously, and equally. The power supplied by a motor/engine is split typically by a differential gear set 80, and the output shafts of the differential provide equal torque to both annuli 32 and 70. Annulus 32, which is the SFC, described above, provides power to all the SFs 36. Further, all the REGs 44 receive power each from the respectively engaged SF and from annulus 70. RSRs 12 accept power from the REGs but intermittently. Each individual RSR 12 of the entire set (typically 8) is prone to engage an REG at a different timing than another segment. The reason is that the number of RSs does not equal the number of REGs, and the rotational velocity of the PSs does not equal the rotational velocity of the imaginary circle connecting all the segments. TCFs 10 receive each power from the respective coupled RSR 12 and finally, terminal collecting gear TCG 54 receives the summation of power from all the TCFs. TCG 54 is transfers the power to a load 82.

Figure 6B:
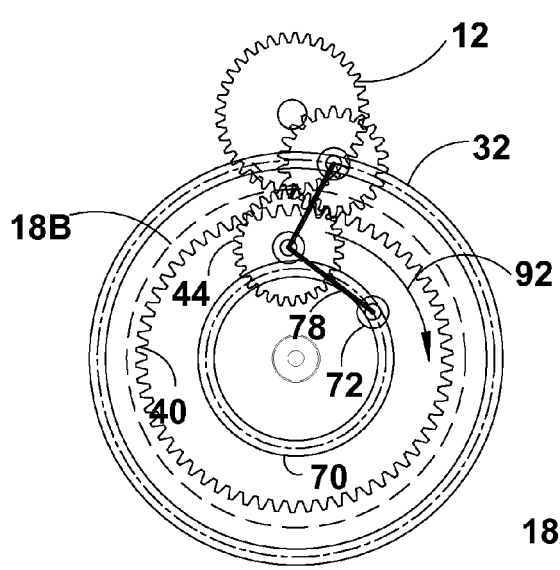
FIG. 6B is a schematic description of the positioning of the ring segment in a retracted state.
Figure 6A:
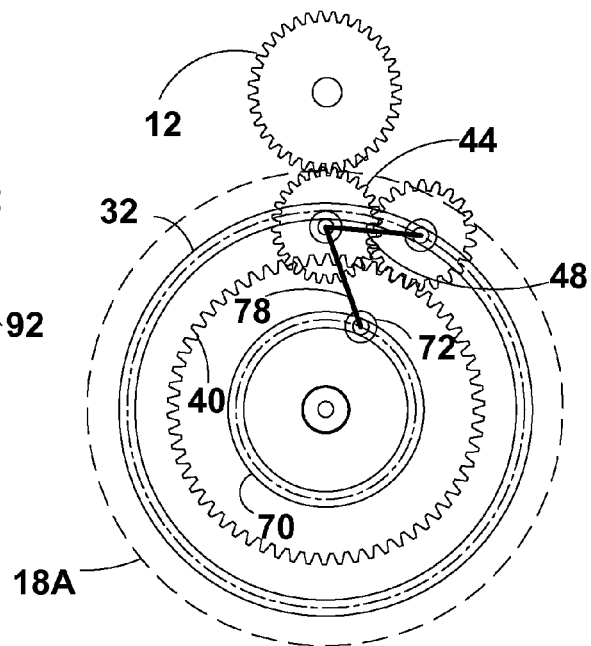
FIG. 6A is a schematic description of the positioning of the ring segment in an expanded state.

As explained above, annulus 32 and annulus 70 both receive power from the differential gear (not shown) that splits the power coming from a motor into two equal power halves, while obeying the law of conservation of energy. In order to change the torque/rotational velocity of TCG 54, a phase shift between the two annuli is affected. To explain the phase shift effect reference is made to FIGS. 6A and 6B. In FIG. 6A, an exemplary RSR 12, is meshed with REG 44 in a transient engagement. Anchor point 72 is a point in which a pivot, a swivel of arm 78 is anchored, swivably. When transiently the power supplied to annuli 32 and 70 deviates from equality, a phase change occurs, as can be seen in FIG. 6B, arrow 92 designates the angular quantity in which anchor point 72 has moved, actually with the entire annulus 32 turning with respect to annulus 70. As a result of this transient phase change between the two annuli, RSR 12 changes position, getting closer to sun gear 40. Fixed length link 48 and arm 78 rearrange accordingly. When the transient shift in power is stopped, the two output shafts of the differential gear mentioned above resume supplying equal power, but the output provided by the RSR is now changed with respect to what it had been before the shift. Circles 18A and 18B are the imaginary circle that defines the innermost reaches of the RSRs. In FIG. 6B it is well inside annulus 32 and in FIG. 6A it is well outside annulus 32.

Figure 7A:
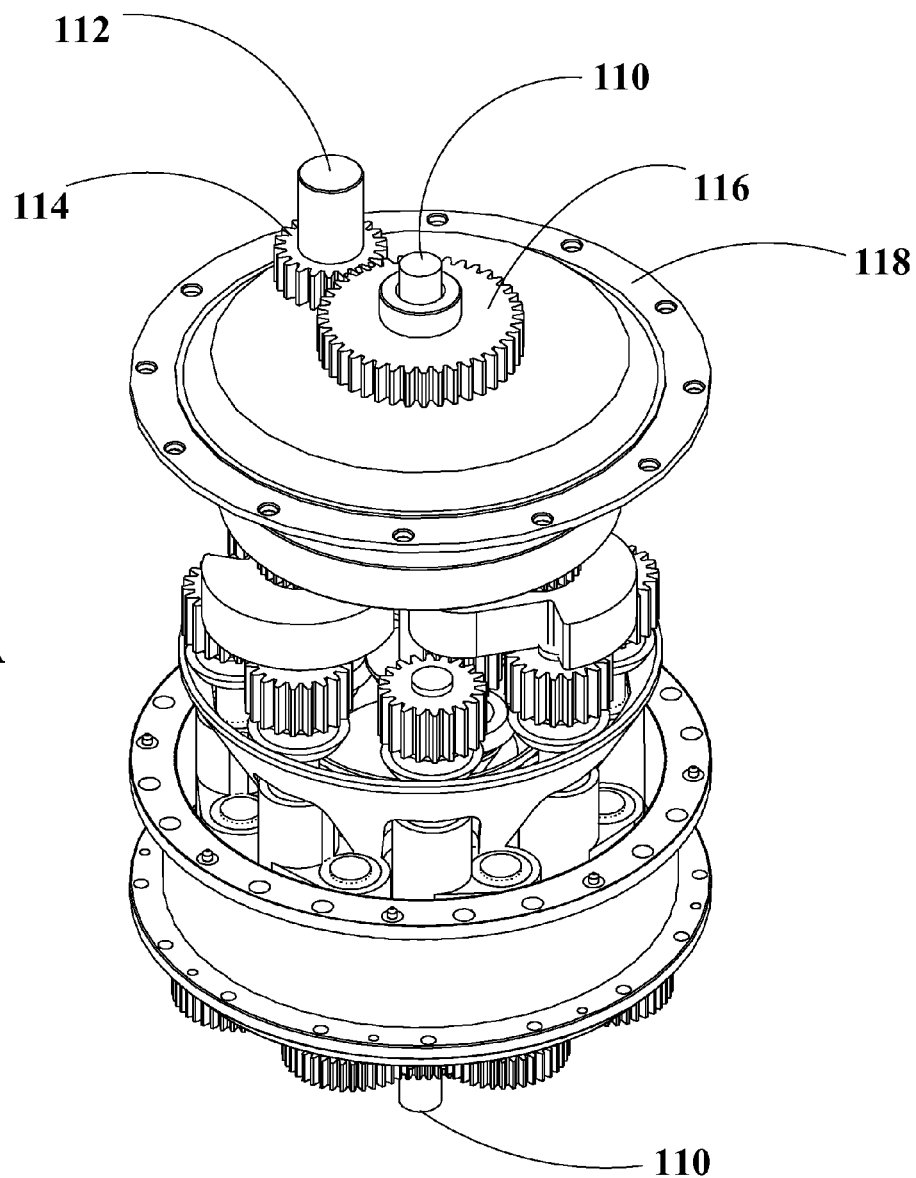
FIG. 7A is a general view of a gearbox having a push pull gear ratio control.
Figure 7B:
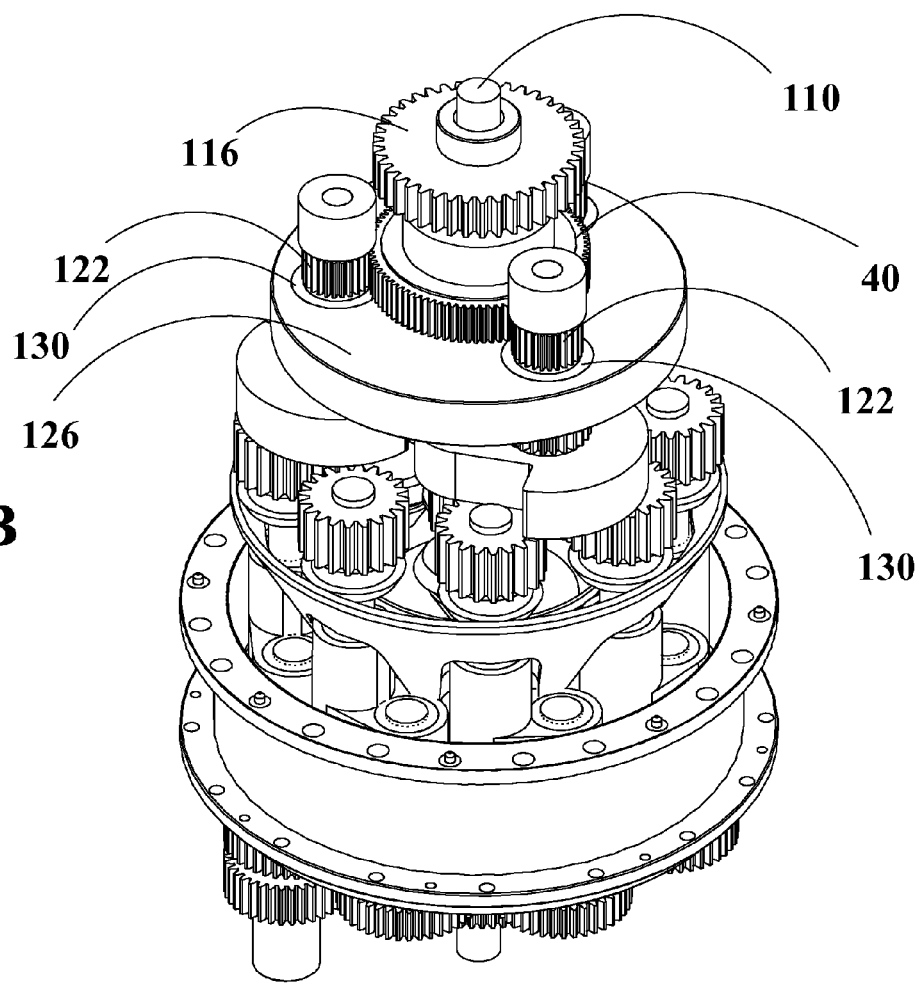
FIG. 7B is an isometric view having a gearbox having a push pull gear ratio control embodiment showing sun-gear and sun followers.
Figure 7C:
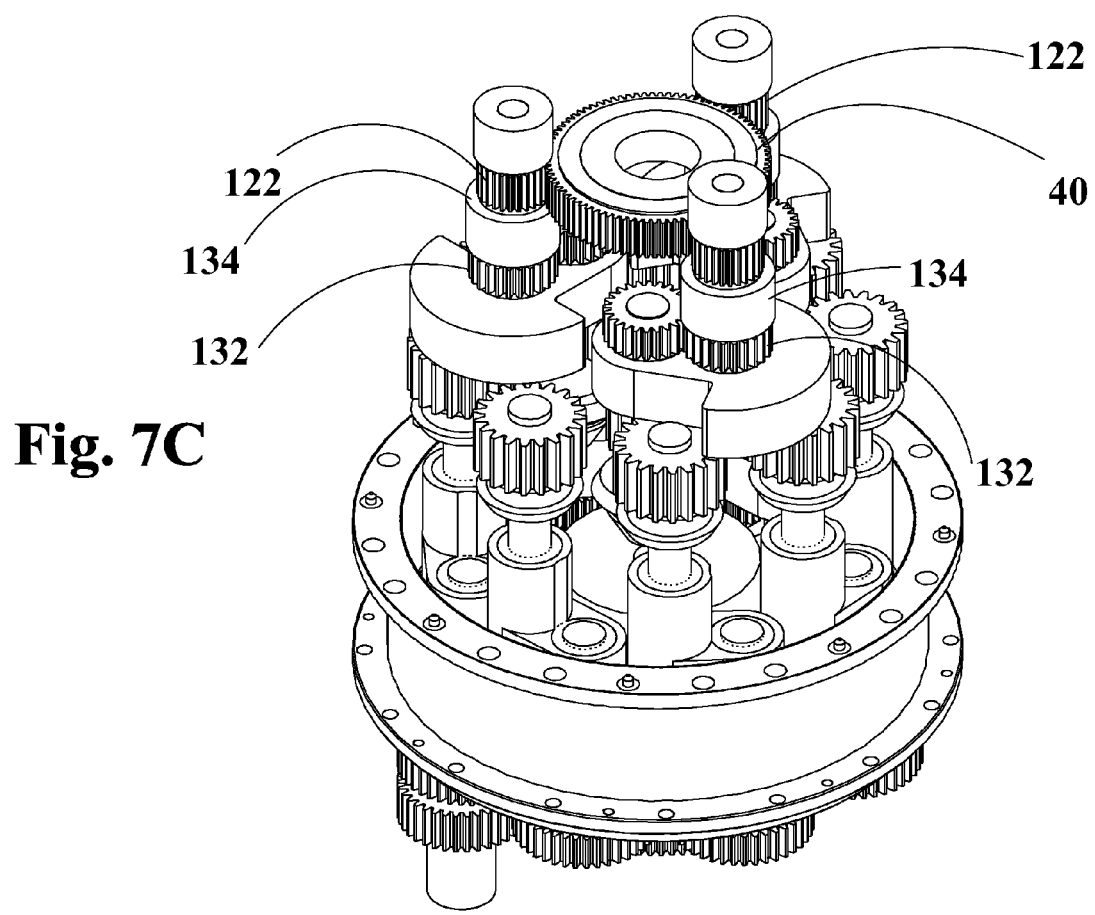
FIG. 7C is an isometric view having a gearbox having a push pull gear ratio control embodiment showing sun followers and surrounding components.
Figure 7D:
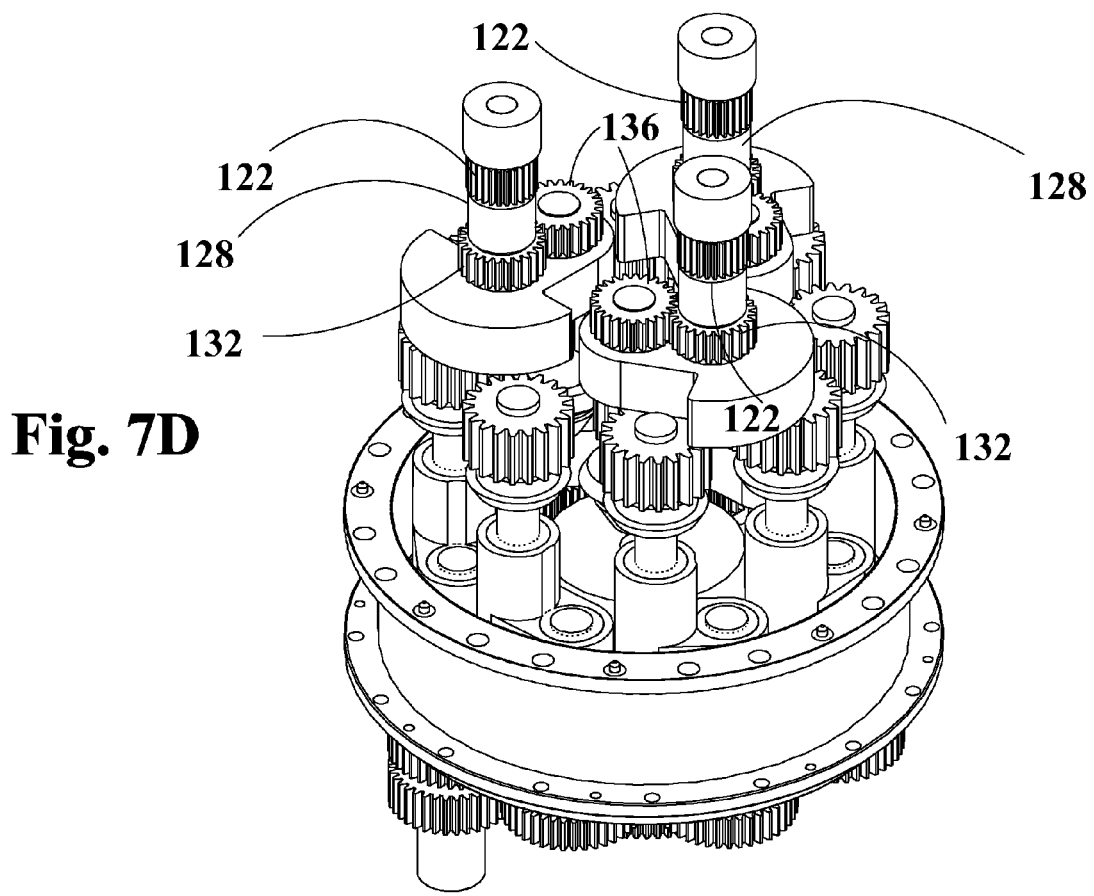
FIG. 7D is an isometric view having a gearbox of a push pull gear ratio control embodiment showing sun follower and gears downstream the flow of power.
Figure 8:
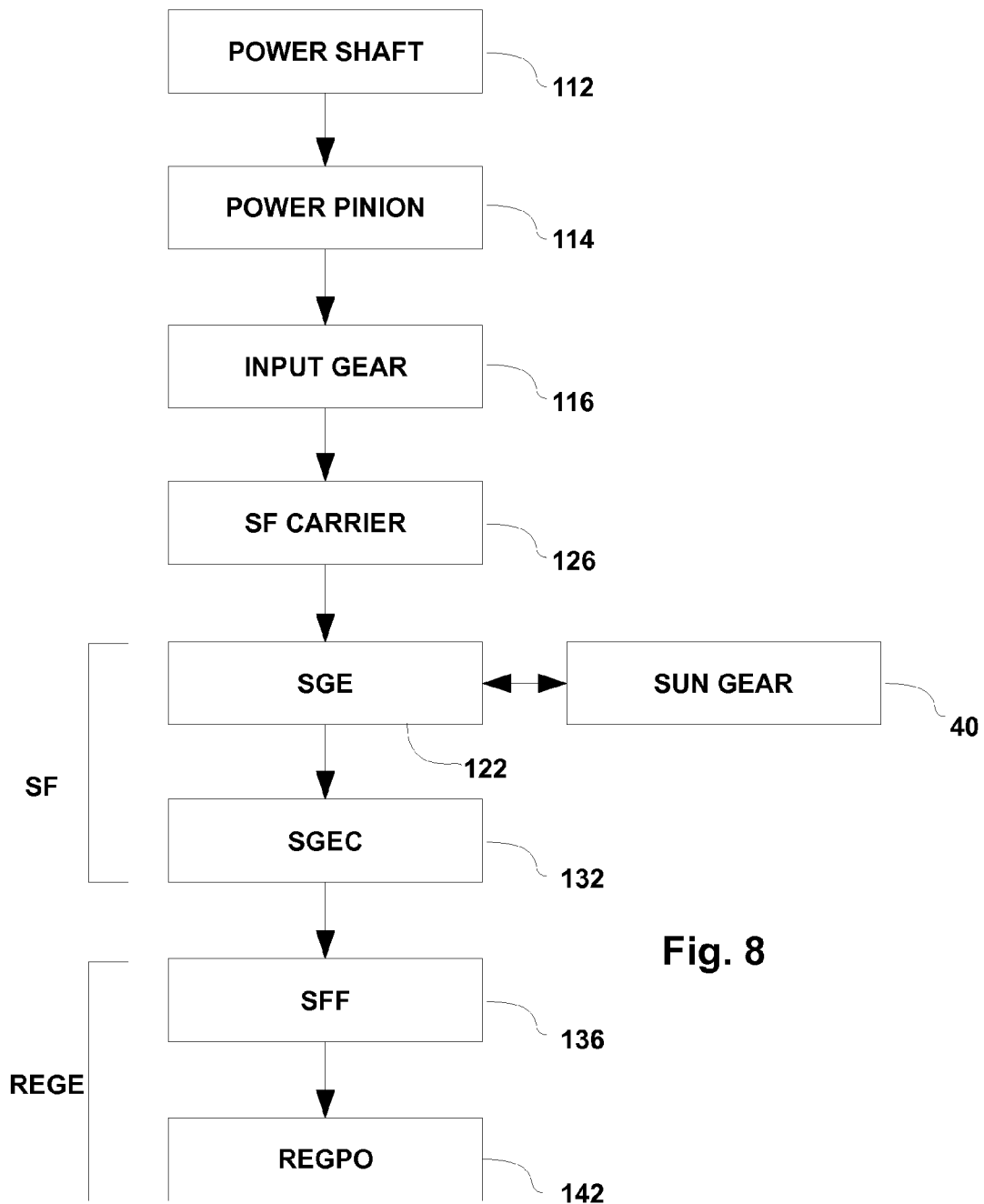
FIG. 8 is a flow chart detailing the downstream flow of torque/power in the gearbox up to a point.
Figure 9A:
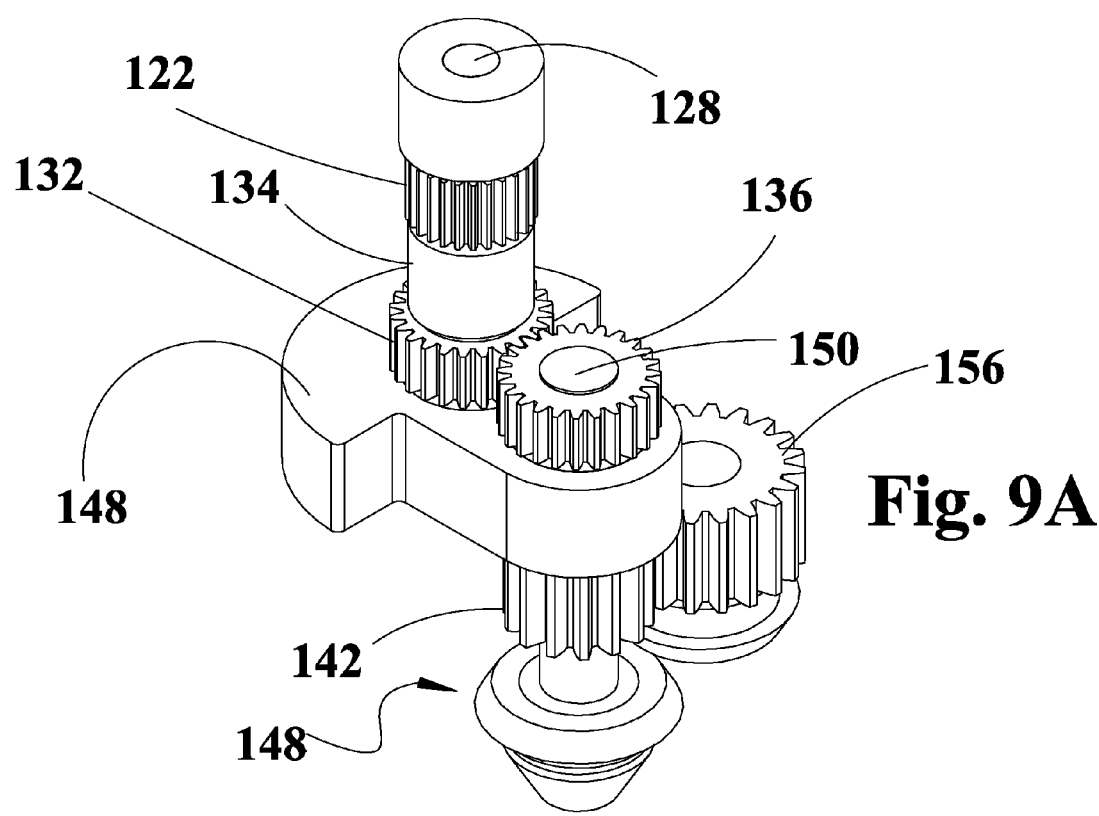
FIG. 9A is an isometric view having a gearbox of a push pull gear ratio control embodiment showing a link between two conjugated pairs, the REG and the SF.
Figure 9C:
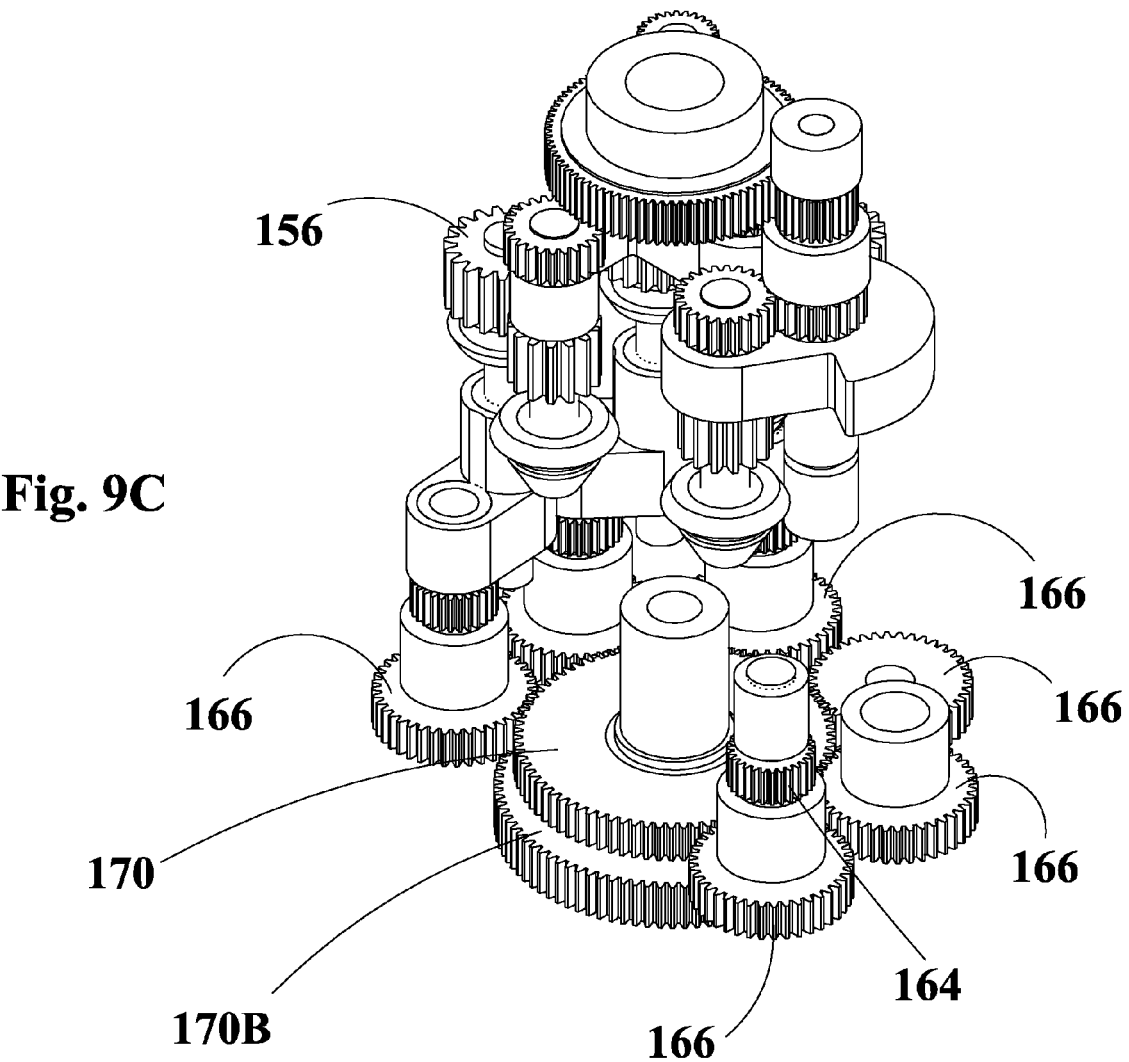
FIG. 9C, is an isometric view similar to 9B, but with emphasis on the terminal conjugates.
Figure 9D:
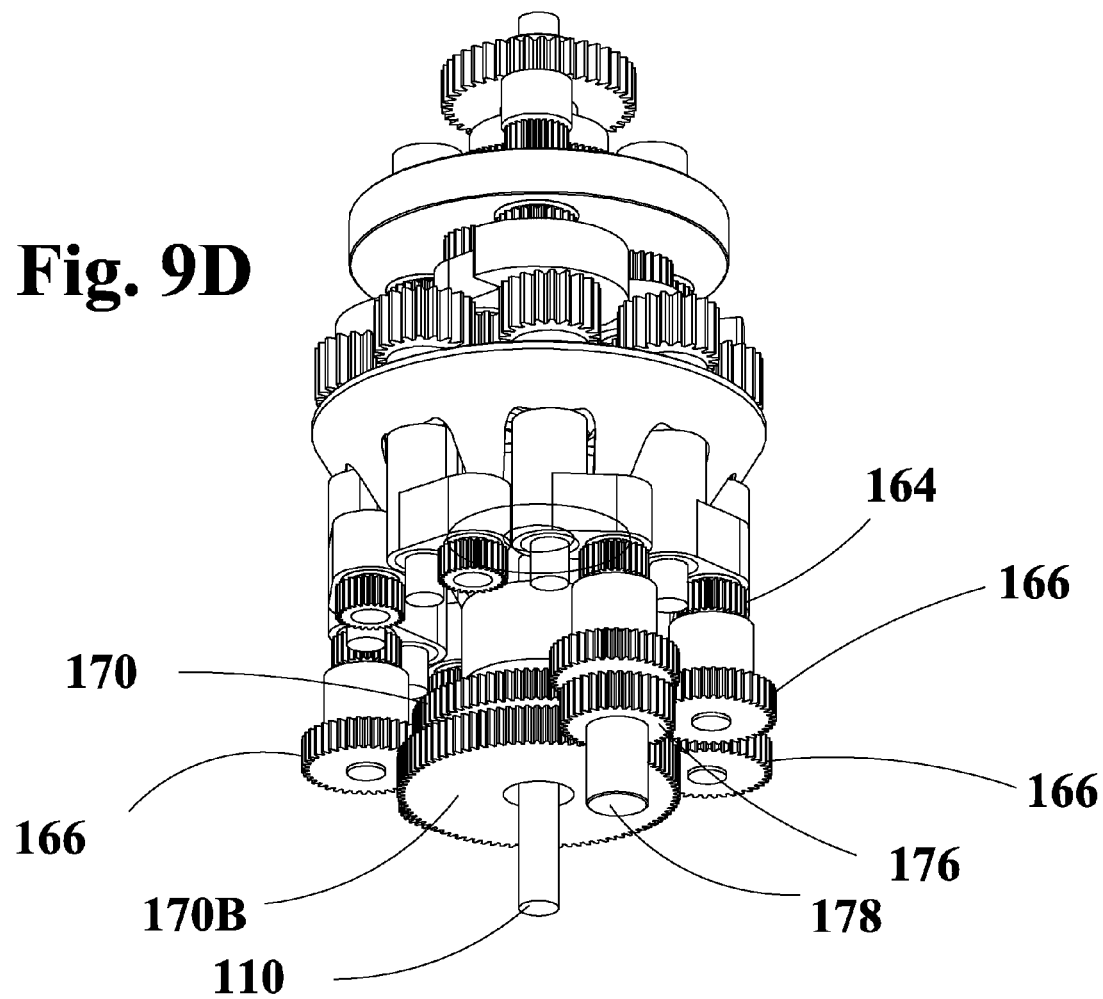
FIG. 9D is an isometric view similar to 9C showing the output aspect of the gear box.
Figure 10:
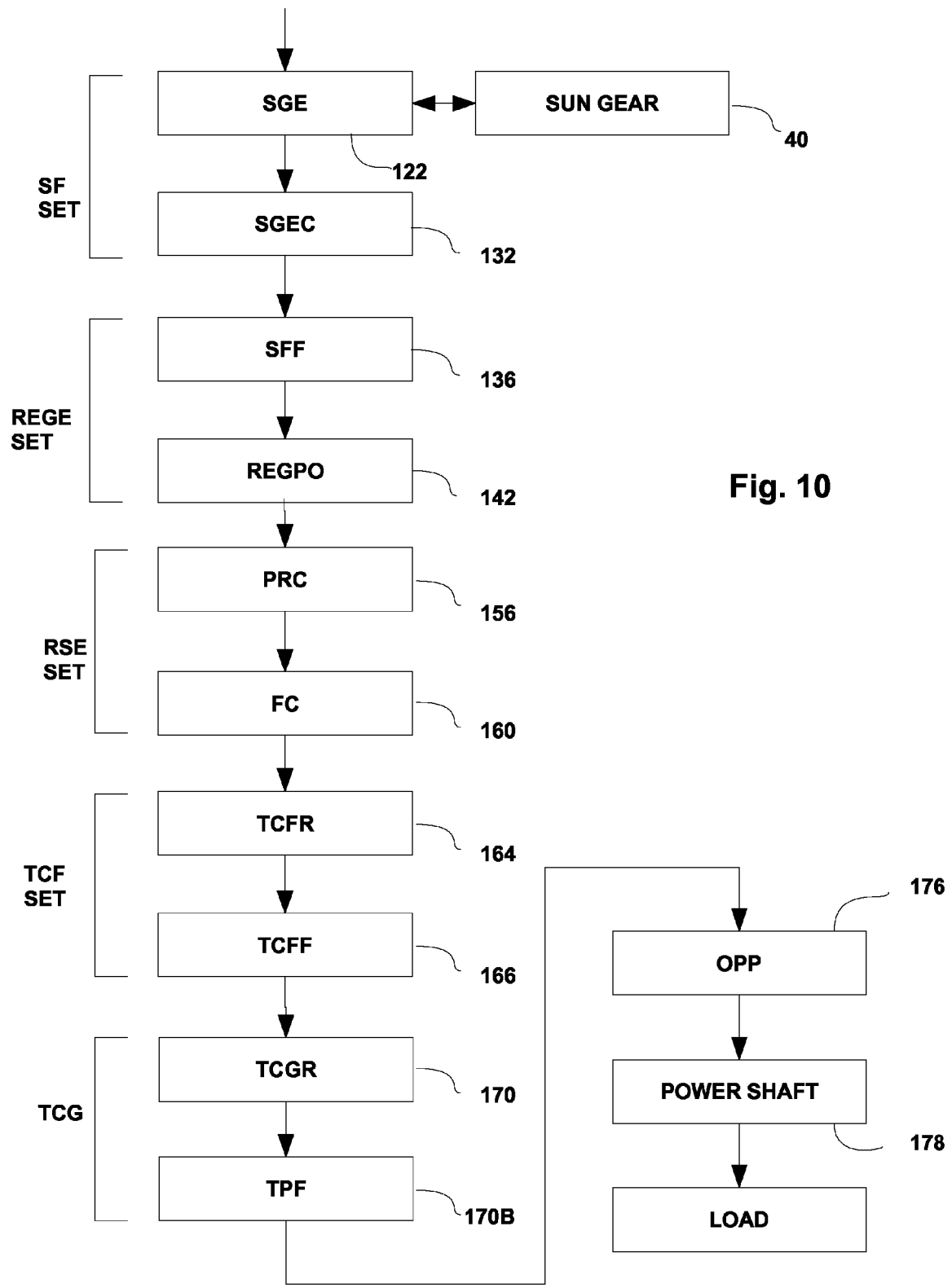
FIG. 10 Is a flow chart, continuing FIG. 8, describing the downstream flow of torque/power in the entire gearbox up to the end, showing all the sets.

Further, a different approach to the control over the gear ratio is achieved by implementing another combination of structural elements. The sets of SFs and the sets of REGs are both formed as conjugated pairs. As in the former embodiment, the sun gear is described as static and specifically in this case it is described statically harnessed to the casing of the gearbox. To understand the structural aspects and the functional aspects of this embodiment, reference is made to FIG. 7A first. Main (central) axis 110 is a feature that marks the geometrical center of the entire gear-set, Its function will be however dealt with later on in the disclosure. Power shaft 112 is the shaft that transfers power from a source of power such as an engine, to the gear-set. Power pinion 114 transfers power to the gearbox by way of input gear 116 with which it is meshed. The sun-gear and the SFs are in this drawing hidden by case member 118, which can be considered as part of the casing of the gearbox to which the sun-gear is statically harnessed. In FIG. 7B, the input gear 116 is shown, without the meshed pinion, and the sun gear 40 is now exposed, showing two of the three sun-gear engagers (SGE) 122, that are meshed with sun-gear 40. SFs carrier 126 is a round planar component in which the axles 128 (not shown) of the SFs are pivotally embedded employing typically a bearing 130. Input gear 116 and the SF carrier 126 are coupled and revolve both around axle 128 (not indicated in this drawing). It should be noted that the sun gear 40 is not coupled to this axle, and it therefore only surrounds the axle, while itself harnessed to the casing. In FIG. 7C the input gear is removed, the SF carrier is removed, exposing the conjugated SFs which include each SGE 122, the SGE conjugate (SGEC) 132 and the axle connecting them both. The axle is concealed by bearing 130, but in FIG. 7D the bearings are removed so SGEC 132 is seen connected by axis 128 to SGE 122. At this level of exposure of components, the REGEs (REG equivalent) appear also in the figure, having several components, one in the form of toothed wheels 136, which are the sun followers-followers or in short, the SFFs 136. Each REGE includes also a counterpart toothed wheel, the REGPO, 142 not shown here, connected by an axle, and together forming a conjugated pair of cogwheels, to be discussed below. The REGE is the object following the SF in the sequence. The REGE has one of its conjugated cogwheels, SFF 136 meshed with one of the cogwheels of the SF, namely SGEC 132. The other cogwheel of the REGE is REGE power out (REGPO) 142. The REGE is an output transfer conjugated pair, having an output transfer cogwheel, REGPO 142. To map the sequence of power transferring objects up to this point, reference is made to FIG. 8, showing the sequence of power/torque transfer in a schematic depiction, from one cogwheel to the next in sequence. In FIG. 9A, link 148 between SF conjugated pair and the REGE conjugated pair is shown. In the link, a bearing supporting the bottom part of axle 128 is embedded, and a bearing covering the axle connecting cogwheel 136 and 142 is also embedded. Frusto-conical object 148 forms the terminal portion of axle 150 of the REGE conjugated pair. The task of conical object 148 will be explained below. Cogwheel 156 is meshed with REGPO 142, receiving and transferring the power/torque from the REGE as will be explained below. As can be seen in FIG. 9B, cogwheel 156 is equivalent to cogwheel 12 described above. In this approach, the RS equivalent (referred to as RSE) is a conjugated pair, including power receiving cogwheel (PRC) 156 and a forwarding cogwheel (FC) 160 in a conjugated arrangement, i.e. both connected to a common axle. In this approach there is another set of conjugated pair cogwheels, that derive the power from the conjugated RSE just described, and are referred to hereinafter as terminal collector follower (TCF) thus, the power receiving cogwheel of the TCF is the TCF receiver (TCFR) 164, and the forwarding cogwheel of the TCF, the TCF forwarder (TCFF), 166, The set of TCFs forwards the power/torque to a single terminal collecting gear (TCG) 170, which may be a conjugate cogwheel, sharing an axle with cogwheel 170B. In FIG. 9C, the set of TCFFs is shown meshed with the terminal power collector (TPC) of which terminal cogwheel receiver TCGR 170, so that the power and torque from the set of TCCFs is forwarded to TCG, from which it can be collected and used, or from its conjugate, cogwheel 170B, the terminal power forwarder (TPF). In FIG. 9D the output end of a gear set of the invention is described. The power collected at conjugated cogwheels 170 and 170B is passed to output power pinion (OPP) 176 which is meshed with cogwheel 170B, and through shaft 178 the power can be transferred to a load. In FIG. 10, the chain of gears including gear conjugates is presented symbolically, in the power downstream transfer direction, the order in which torque/power are transferred. Sun follower SF is the first conjugated pair, includes gears 122-132 sharing an axle. A structural feature of gear set in accordance with the present invention is that the SF conjugates form a set of equal members, i.e. there are several identical SF conjugates deployed evenly around the sun gear. The next gear conjugated pair 136-142 are the REGE gears, also forming a set, each of the members of the set is a conjugate keeping contact with the previous gears, and transferring power to the next conjugated pair, the RSE. The ring segments include conjugates 156-160, forming a set, all the members of which are arranged evenly around the central axis. The members of the RSE set transfer the power to the next gear conjugates set TCF (which includes the conjugates pair 164-166), members of which set are equal, and each member deriving power/torque from the previous set, the RSE. The next in order is the set of conjugates TCG which includes one conjugate 170-170B.

Gear Ratio Shifting Mechanism

Figure 11A:
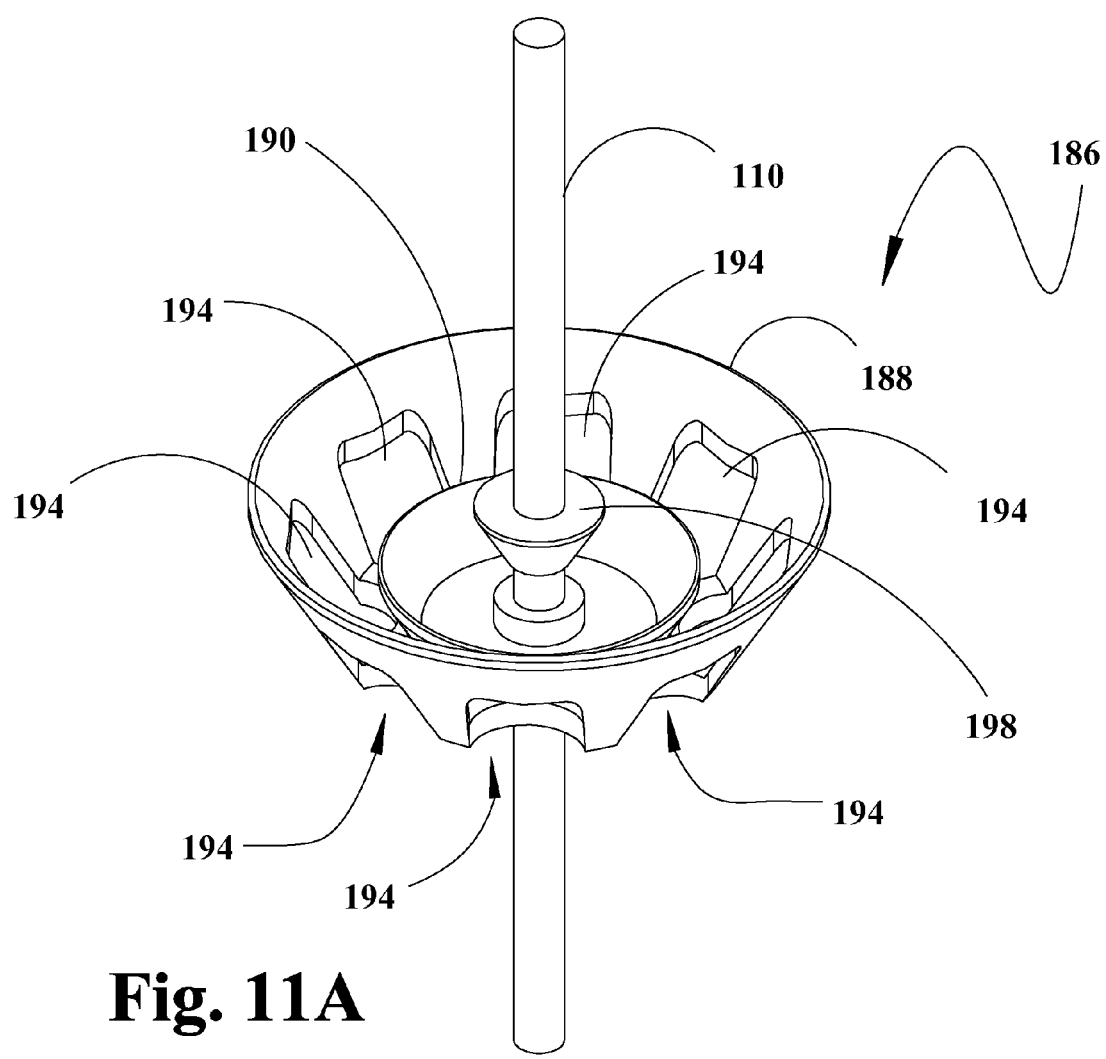
FIG. 11A is an isometric view of the gear ratio shifter module of the invention.
Figure 11B:
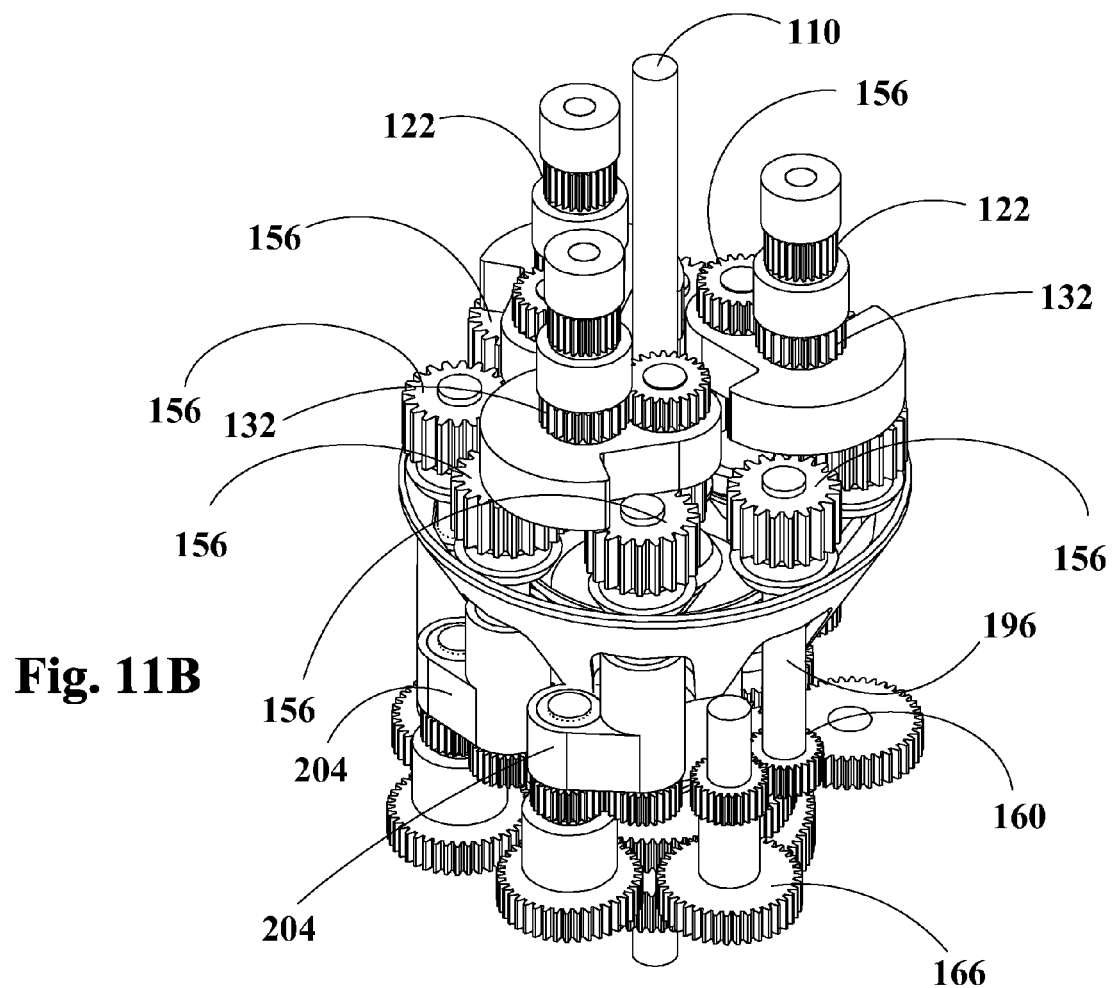
FIG. 11B is an isometric view of the gear ratio shifter module showing power receiving cogwheels.
Figure 12:
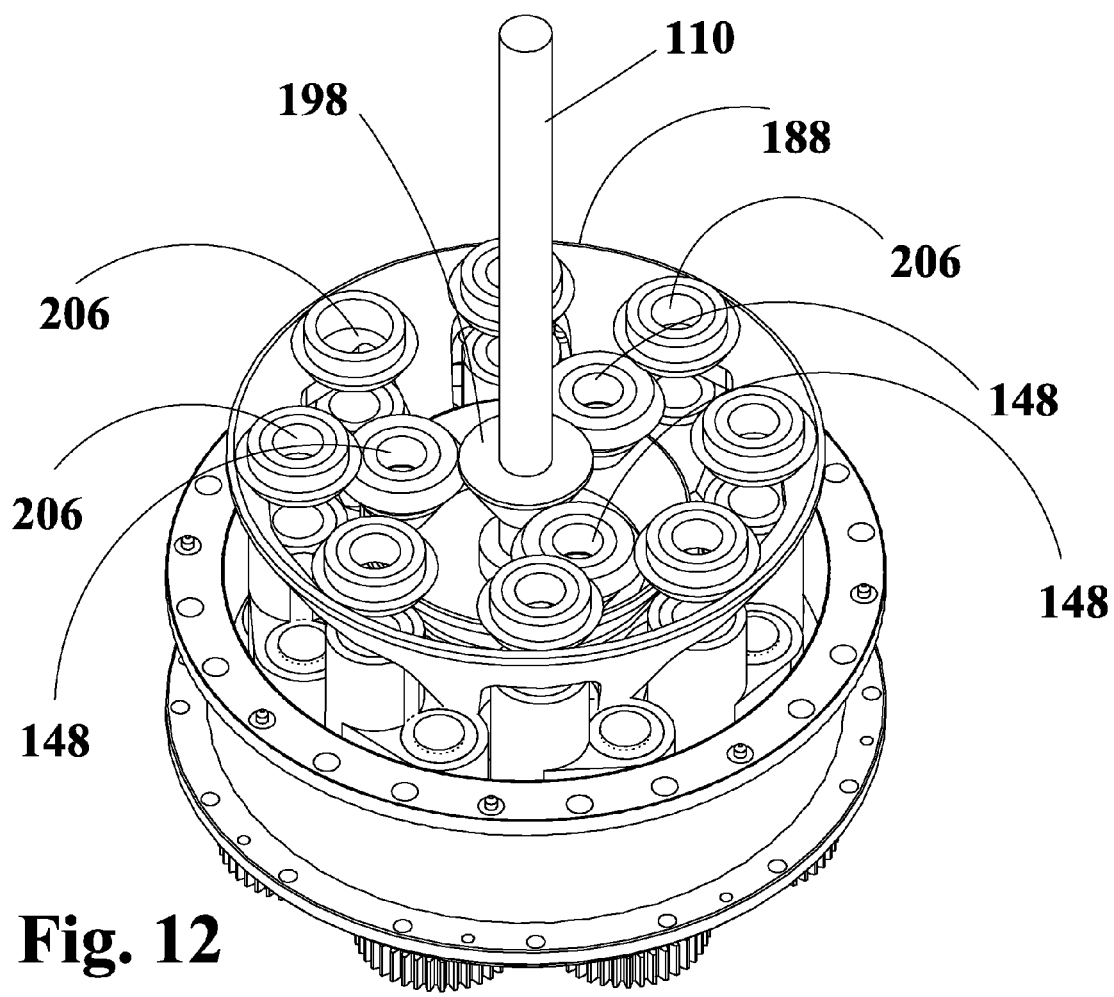
FIG. 12 is an isometric view of the gear ratio shifter module showing SATEs and ICSATEs.
Figure 13A:
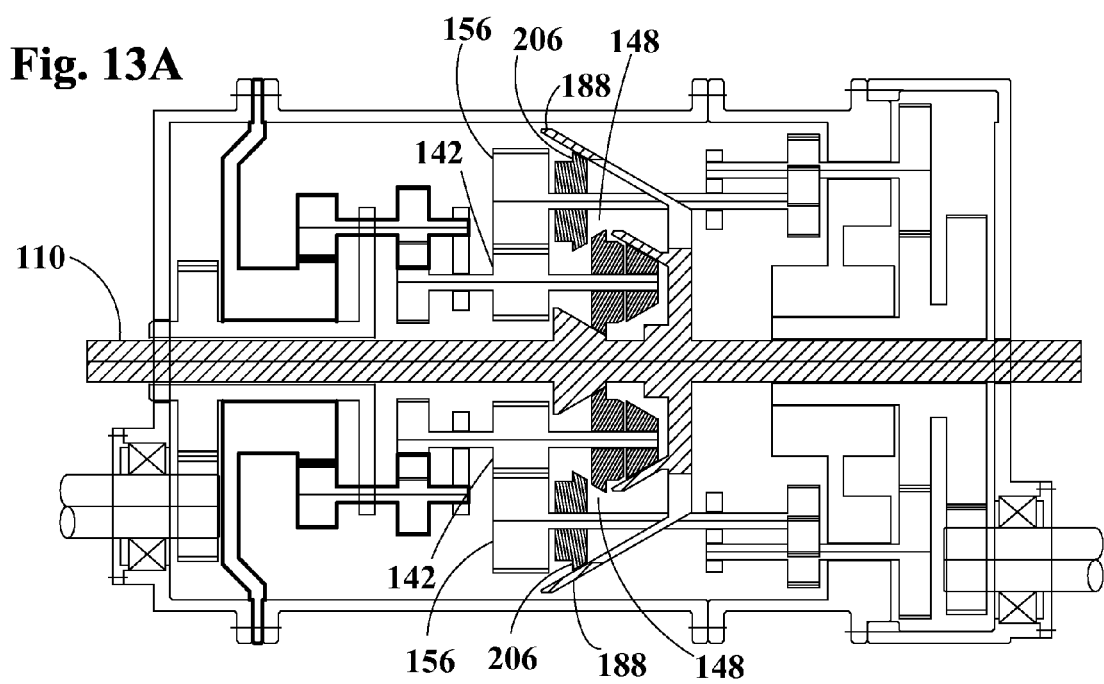
FIG. 13A is a sectional view of a gear box of the invention showing the SATE system in a retracted state.
Figure 13B:
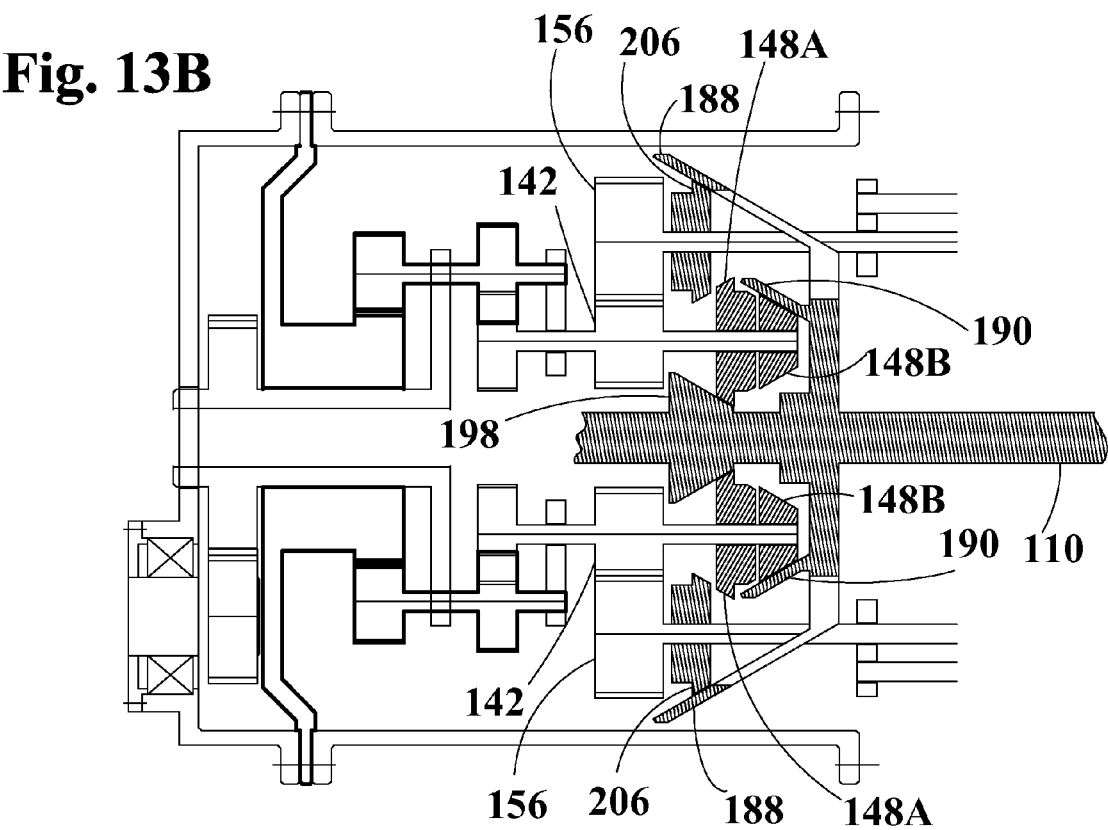
FIG. 13B is a sectional view of a gear box of the invention showing all the gears sliding and rolling engagers with subtended cogwheels.

The gear ratio shifter (GRS) module 186 of the second embodiment is described schematically in FIG. 11A. Main axis 110 has several appendages. The largest one is cup shaped which may be described as a hollow frustum of a cone 188, and will be referred to hereinafter as large cone (LC) with the opening pointing upwards in the figure. Inside the hollow frustum of cone 188, a smaller hollow frustum of a cone 190 resides, which will be referred to hereinafter as smaller cone (SC), it also has the opening looking upwards. On the walls of LC 188, windows 194 are carved out evenly around. The reason for the existence out of windows 194 is to allow passage of axles 196 (not shown here, to be discussed below). Solid conical appendage 198 is disposed coaxially on the main axis and as conical structures 188 and 190 it is involved in the facilitation of the gear ratio change as will be discussed below. In FIG. 11B, an overall view of the gear box of the invention is shown, with some parts removed to improve clarity. Axle 196 is shown stripped of its cover, connecting between cogwheel 156 and 160, which together referred to as the RSE. In FIG. 11C some more parts are removed to show how the gear components interact with the GRS. Sliding and rolling engagers (SARE) are the frusto conical elements encircling axles 196 and therefore constitute a part of each member of the RSE set. One of cogwheels 156 is shown meshed with cogwheel 142, in a transient relationship (there are more PRC 156 cogwheels than there are REGPO 142 cogwheels). Axle 150 of the REGE revolves with the attached cogwheels, including REGPO 142 (the other one not shown). A PRC 156 when meshed, revolves by the torque bestowed to it by REGPO 142. Structurally, when meshed with REGPO 142, PRC 156 may occupy a position around REGPO 142 as designated by double headed arrow 202 disposed in a plane dissecting axis 110 at a right angle. As discussed above, each member of the RSE set has a SARE 206 which is engaged with the inner surface LC 188. When cone 188, together with the entirety of GRS 186 moves upwards in the direction of arrow 192, the inner surface LC 188 presses against the set of all the SARES 206, whereby they are made to slide in a circular path (see arrow 202) in a horizontal plane to a favourable position, even if they are not engaged (meshed) with of the REGPO cogwheels 142. The horizontal circular path of cogwheels 156, or as better described, of the conjugate pair RSE, is restrained by link 204 as can be seen in FIG. 11B. Link 204 links between the two conjugate pairs: the RSE and the TCF. In addition to SARE set 206, there is another set of sliding and rolling engagers. In FIG. 12 inner circle sliding and rolling engager (ICSARE) 148 is shown, outer circle of SAREs 206 flanks LC 188, while at the inner circle, ICSARES 148 are apparent. The ICSAREs are not only located in an inner circle, they are also inferior, engaging SC 190 (not shown here). Appendage 198 is effectively a cam, with which ICSAREs 148 engages and is kept in the correct orientation by doing so. In FIG. 13A, a cross sectional view, the relationship between the SAREs, the ICSAREs and the cams are elaborated. The engagement (meshing) between cogwheel 142 and cogwheel 156 is transitory, they are not held together by a link. There are more of cogwheels PRC 156 than there are REGPO 142, such that PRCs 156 revolve as a circle in an angular movement with respect to the imaginary circle on which all REGPOs 142 are situated. The role of GRS module 186 is not only to dictate gear ratio but also to keep the meshing between a specific REGPO 142 and a respectively PRC 156 effective, tightly, when such engagement occurs. The number of PRCs provided in a specific make of the gear box of the invention (in both approaches) is such that at each point in time at least one transient linkage is effectively functional. In FIG. 13B, a more detailed cross sectional view shows how rim of SC 190 abuts and limits cones 148. A more detailed look, shows that cones 148 are in fact divided each into a two components, a larger frusto-conical structure 1448A and smaller one, namely cone 148B, both revolvable on the same axis. Keeping them restrained in a specific circle diameter around main axis 110 is conical appendage 198 with which conical structure 148A is engaged flanking. The reason for having two separate cones of the cone 148, is that the conical structure 148A revolves in an opposite direction as 148B. In FIG. 13C, the GRS module is pulled to the right maximally. SAREs 206 are spread out maximally, having moved in the direction of arrows 212 relative to the GRS module, and having reached the edge of rim of LC 188. Likewise, ICSAREs 148 are higher up on the rim of SC 190, having travelled in a direction parallel to arrows 212 relative to the GRS module (not relative to the gear-box). It is to be stressed that both the SAREs and the ICSAREs are static on the longitudinal dimension of the gear box, it is only the GRS module that can move, within limits, right or left on the longitudinal axis of the gear box. Coupled pair 156-160 is affected by the movement of the GRS, As the GRS is pulled to the right cogwheel 156 follows the inner wall of LC 188, and to that properly a spring (not shown) is applied on the axle that connects cogwheel 156 with cogwheel 160, urging it permanently towards the outside of the gear box. Cogwheel 142 on the other hand, associated with SARE 148, does not require a spring biaser, because SARE 148 is always limited by two conical surfaces, i.e. the inner surface of SC 190 and the slanted surface 224 of conical appendage 198.

The Links and Linkage

These components secure and restrain the association between the two conjugates of a conjugated pairs. Link 48 as seen in FIG. 1C keeps the two cogwheels 44 and 36 meshed at all circumstances, arm 78 translates the transient change in rotational force applied to annuli 32 and 70 into a setting of a new distance to the cogwheel 44 relative to sun-gear 40. Cogwheels 44 and 36 constitute a linked couple. As can be seen with reference to FIG. 1B link 14, maintains the permanence of distance between RSR 12 and TCF 10.

Figure 14:
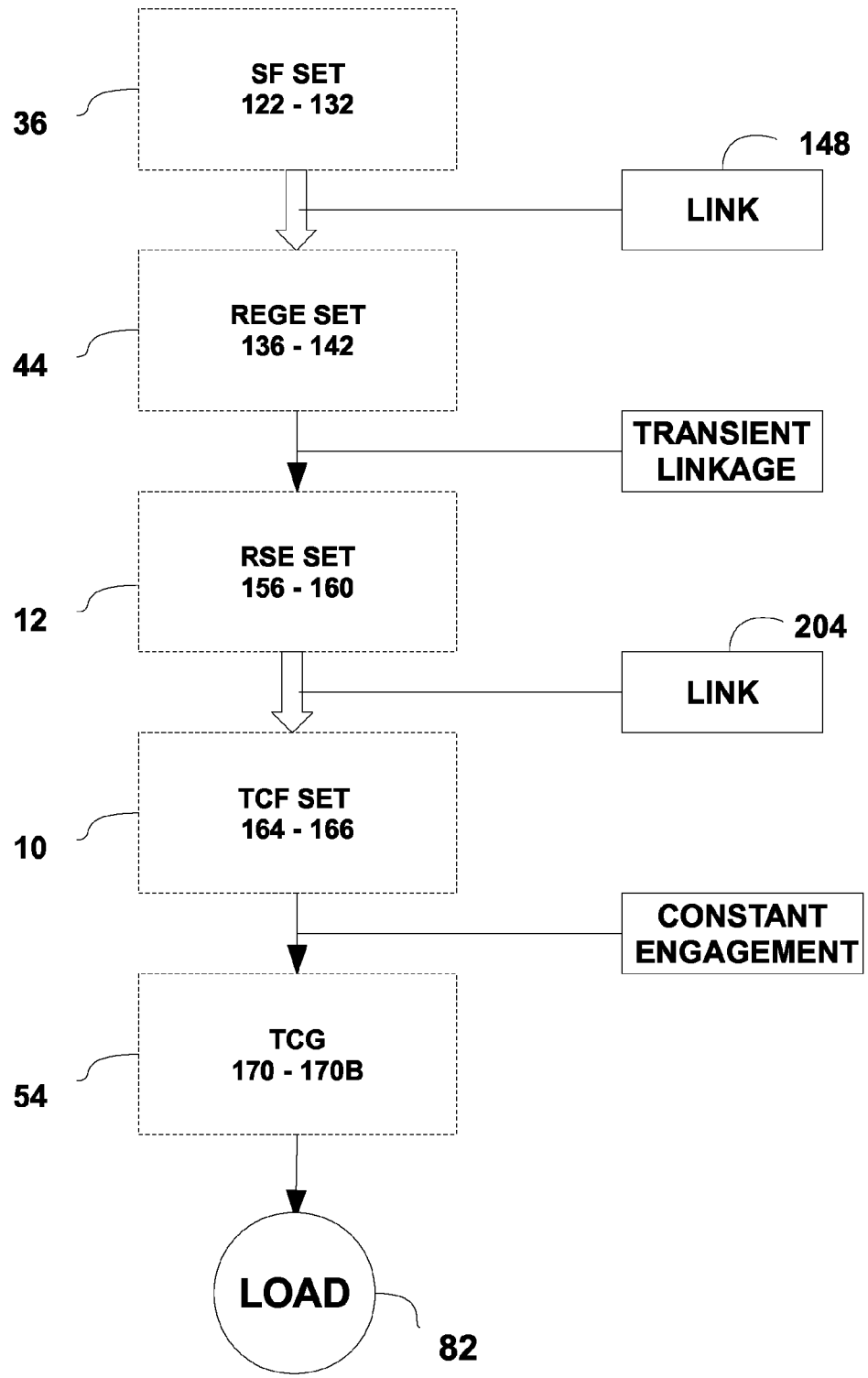
FIG. 14 is a isometric view of a gear box of the embodiment showing all sliding and rolling engagers.

In FIGS. 9A, 11B and 14, the links of the second approach were given different notations because of the different environment in which they are implemented, but in effect, link 148 maintains the relationship between SF 36 set and REGE set and is therefore equivalent to link 48. Link 204 in FIG. 11B maintains the relationship between RSE 12 and TCF 10, which therefore constitute a linked couple, and the link equivalent to link 14 in FIG. 1B. The linkage between TCF 10 and TCG 54 is permanent and maintained by the structural framework of the gearbox itself. The linking of the second approach are summarized in FIG. 14. To which reference is now made.

The invention claimed is:

1. A planetary gear-set for continuously varying the output ratio between torque and rotational velocity, in which a sun-gear is considered as a reference to all other components, said system comprising:

a first set of segments of a ring gear, each such segment includes at least a permanently linked couple of cogwheels of which at least one cogwheel receives power and is capable of changing its distance from said sun gear its axle is not bound to a carrier, and at least another cogwheel that passes on power to a terminal collecting gear the axle of which power-passing cogwheel is bound to a carrier;

a second set of couples of cogwheels, each such couple including also at least a link to permanently keep said couple of cogwheels constantly meshed, wherein in each such couple one cogwheel is a sun-gear follower and another is a ring engaging gear and wherein the axle of said ring engaging gear is not bound to a carrier;

a mechanism for changing the distance of said ring engaging gear with respect to said sun-gear follower, and wherein power is received from a source at least through a carrier of said sun-gear followers.

2. A planetary gear-set as in claim 1, said gear-set comprising:

an internal gear ratio shifting mechanism consisting of a central axis to which are appended at least:

a conical appendage at the end of ring engaging gear, said appendages composed each of two parts, one at the end abutting the inside of a first hollow frustum of a cone (190) appended on said central axis, and the other abutting a solid conical appendage (198);

a conical appendage on said non bound axle of the ring segment, being limited in movement by a second hollow frustum of a cone (188) appended on said central axis, wherein said first hollow frustum of a cone is nested inside said second frustum of a cone and wherein the movement of said gear ratio shifting mechanism causes the set of ring segments to expand or retract with respect to the central axis of said gear-set.

3. A method for continuously varying the output ratio between torque and rotational velocity provided to a mechanical load, said method comprising the steps of:

receiving power from a rotating shaft, said shaft providing torque;

transferring said torque to a first set of a plurality of linked couples, each such couple is a mutually permanently meshed toothed wheels, wherein said plurality of linked couples are arranged so that one of the members of said pair is on a circle around a sun-gear having a fixed radial distance from said sun-gear while the other member of each of said pairs has a radial movement around the axle of the other member of the couple;

transferring said torque from said first set of plurality of linked couples to a second set of plurality of linked couples of toothed wheels, by transient linkage, wherein said second set of linked couples has per each couple one toothed wheel having a fixed radial distance from said sun-gear, said distance being larger than the fixed radial distance of said first set of toothed wheels, the other toothed wheel per each linked couple is capable of radial movement around the axle of the other toothed wheel in the couple, and increasing or decreasing the distance of a toothed wheel in each of said two sets of linked couples from said sun gear, thereby changing the ratio between torque and said rotational velocity.

4. A method as in claim 3, wherein said increasing or decreasing the distance of each one of the toothed wheels of said first set and said second set of plurality of linked couples capable of being moved relative to the axis of its conjugate toothed wheel, is achieved by a gear ratio shifter mechanism, its use comprising the steps of:

shifting by sliding the distance of the members of said two sets of linked couples capable of being shifted, away or towards said sun-gear;

thereby shifting the ratio of torque/rotational velocity as received by a terminal collector followers and then to terminal collecting gear, and said terminal collecting gear passing the torque to a load.

5. A method as in claim 3, wherein power is received from a source by both sun followers carrier and a carrier associated with said ring equivalent.

* * * * *